(12) United States Patent
Sugimoto et al.

(10) Patent No.: US 7,720,153 B2
(45) Date of Patent: May 18, 2010

(54) VIDEO ENCODING APPARATUS, VIDEO ENCODING METHOD, VIDEO ENCODING PROGRAM, VIDEO DECODING APPARATUS, VIDEO DECODING METHOD AND VIDEO DECODING PROGRAM

(75) Inventors: Kazuo Sugimoto, Fujisawa (JP); Fulvio Moschetti, Munich (DE); Choong Seng Boon, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1060 days.

(21) Appl. No.: 10/810,792

(22) Filed: Mar. 26, 2004

(65) Prior Publication Data
US 2004/0233991 A1    Nov. 25, 2004

(30) Foreign Application Priority Data
Mar. 27, 2003    (JP) .......................... P2003-088618

(51) Int. Cl.
H04N 7/12    (2006.01)
H04N 11/02    (2006.01)
(52) U.S. Cl. .................... 375/240.16; 375/240.15; 375/240.24; 375/240.25
(58) Field of Classification Search ............ 375/240.15, 375/240.16, 240.24, 240.25
See application file for complete search history.

(56) References Cited

U.S. PATENT DOCUMENTS 5,754,240 A * 5/1998 Wilson .................. 375/240.15
6,167,157 A 12/2000 Sugahara
6,272,177 B1 8/2001 Murakami et al.
6,950,469 B2 * 9/2005 Karczewicz et al. ... 375/240.17
7,227,901 B2 * 6/2007 Joch et al. .............. 375/240.29
2002/0146072 A1* 10/2002 Sun et al. ................ 375/240.16

FOREIGN PATENT DOCUMENTS

EP    1 246 131    10/2002

OTHER PUBLICATIONS

Shen D. et al. "Adaptive motion vector resampling for compressed video down-scaling", Image Processing, 1997, proceedings, International Conference on Santa Barbara, CA, USA Oct. 26-29, 1997, Los Alamitos, CA, USA, IEEE Comput. Soc., US, vol. 1, Oct. 26, 1997.

(Continued)

Primary Examiner—Mehrdad Dastouri
Assistant Examiner—Anner Holder
(74) Attorney, Agent, or Firm—Brinks Hofer Gilson & Lione

(57) ABSTRACT

In the motion compensation prediction unit 2 of the video encoding apparatus 1, complexity information which indicates a degree of complexity of movement from the reference frame for each of the plurality of blocks in which a coding target image is divided. The predicted image is generated by using a prediction reference image to which filtering pixels are provided in accordance with the complexity information on the basis of a predetermined rule which increases the number of the filtering pixels which have pixel values produced by applying low-pass filter with strong high-frequency cutoff characteristics among a plurality of low-pass filters with different high-frequency cutoff characteristics to neighborhood integer pixels.

22 Claims, 28 Drawing Sheets

OTHER PUBLICATIONS

"Text of Final Committee Draft of Joint Video Specification (ITU-T Rec. H.264/ISO/IEC 14496-10)", International Organization for Standardization—Organization International Del Normalization, Jul. 2002.

Pang K. K. et al., "Optimum Loop Filter in Hybrid Coders" IEEE Transactions on Circuits and Systems for Video Technology, IEEE Inc. New York, US, vol. 4, No. 2, Apr. 1, 1994.

Bjontegaard G., "Clarification of "Funny Position"", ITU, Study Group 16-Video Coding Expers Group, Question 15, 'Online!, Aug. 22, 2000.

EPO Office Action dated Jun. 28, 2006.

G. Bjontegaard, "Clarification of "Funny Position"", ITU-T SG 16/Q15, doc. Q15-K-27, Portland, 2000.

Office Action dated Dec. 22, 2009, issued in European Patent Application No. 04 007 397.5, 8 pages.

* cited by examiner

VIDEO ENCODING APPARATUS, VIDEO ENCODING METHOD, VIDEO ENCODING PROGRAM, VIDEO DECODING APPARATUS, VIDEO DECODING METHOD AND VIDEO DECODING PROGRAM

BACKGROUND OF THE INVENTION

1. Field of the Invention

The present invention relates to a video encoding apparatus, a video encoding method, a video encoding program, a video decoding apparatus, a video decoding method and a video decoding program.

2. Related Background of the Invention

Generally, in a video encoding apparatus, a coding target frame is divided into a plurality of blocks of predetermined size, and motion compensation prediction between each of the blocks and a prediction reference image of a predetermined region in a reference frame is performed so that motion vectors are detected, thus producing a predicted image of the coding target frame. In the video encoding apparatus, the coding target frame is expressed by motion vectors from the reference frame, so that the redundancy existing in the time direction is reduced. Furthermore, a prediction residual image based on a difference between the coding target frame and the predicted image is converted by DCT (Discrete Cosine Transform), and is expressed as a set of DCT coefficients, so that the redundancy existing in the spatial direction is reduced.

In the abovementioned video encoding apparatus, in order to achieve a further reduction of the redundancy existing in the time direction, the motion compensation prediction is performed with a high resolution by disposing interpolated pixels at the 1/2 pixel positions or 1/4 pixel positions between the integer pixels of the reference frame, so that the encoding efficiency is improved. A pixel value obtained by applying linear filter of (1, −5, 20, 20, −5, 1)/16 to 6 integer pixels that include 3 neighborhood integer pixels each on the left and right is given to the interpolated pixel that is located in the 1/2 pixel position between the integer pixels that are lined up in the horizontal direction. A pixel value obtained by applying a linear filter of (1, −5, 20, 20, −5, 1)/16 to 6 integer pixels that include 3 neighborhood integer pixels each above and below is given to the interpolated pixel that is located in the 1/2 pixel positions between the integer pixels that are lined up in the vertical direction. A mean value of the pixel values of interpolated pixels in the 1/2 pixel positions which are adjacent in the horizontal direction is given to the interpolated pixel that is located at equal distances from four neighborhood integer pixels. Furthermore, a linearly interpolated value from two pixels among the neighborhood integer pixels or interpolated neighborhood pixels in the 1/2 pixel positions is given to the interpolated pixel that is in the 1/4 pixel position. Namely, pixel values obtained by applying filtering to neighborhood integer pixels are given to the interpolated pixels, so that even in cases where the difference between the reference frame and the coding target frame is large. Thus the redundancy is effectively reduced.

Here, a video encoding apparatus is known in which motion compensation prediction is performed by giving the means values of four neighborhood integer pixels to the pixels at the (3/4, 3/4) pixel positions in order to improve the filtering effect further (for example, see G. Bjontegaard, "Clarification of "Funny Position"", ITU-T SG 16/Q15, doc. Q15-K-27, Portland, 2000.). In such a video encoding apparatus, the interpolated pixels are provided by using low-pass filters of which spectral band-pass in low frequency band is narrower than filter corresponding to linear interpolation, thereby improving the effect of filtering further. As a result, the redundancy is reduced. The interpolated pixels to which low-pass filters of which spectral band-pass in low frequency band is narrow are applied are called "Funny Positions".

SUMMARY OF THE INVENTION

In the abovementioned video encoding apparatus, the following problem is encountered: namely, although the redundancy is reduced by providing the funny positions in the case of blocks of the coding target frame in which the variation from the reference frame is large, the provision of the funny positions increase the difference from the reference frames in the case of blocks of the coding target frame in which the variation from the reference frame is small, so that the effect of achieving high resolution of motion compensation prediction is lost.

The present invention was devised in order to solve the abovementioned problem; it is an object of the present invention to provide a video encoding apparatus, video encoding method and video encoding program which allow the realization of an improvement in the encoding efficiency due to an increase in the resolution of motion compensation prediction and an improvement in the encoding efficiency due to filtering, and a video decoding apparatus, video decoding method and video decoding program which restore a video from compressed data generated by the video encoding apparatus of the present invention.

In order to solve the abovementioned problem, a video encoding apparatus of the present invention comprises motion compensation prediction means for generating a predicted image of a coding target frame by dividing the coding target frame into a plurality of blocks, generating a prediction reference image that are formed by providing interpolated pixels which are produced by interpolation between integer pixels from integer neighborhood pixels in a predetermined region of a reference frame, and determining a motion vector for the prediction reference image for each of the plurality of blocks. The motion compensation prediction means has complexity extraction means for extracting complexity information which indicates a degree of complexity of movement from the reference frame for each of the plurality of blocks; and predicted image generating means for generating the predicted image by using the prediction reference image to which filtering pixels are provided in accordance with the complexity information on the basis of a predetermined rule which increases the number of the filtering pixels which have pixel values produced by applying a low-pass filter of which spectral band-pass in low frequency band is narrow among a plurality of low-pass filters with different high-frequency cutoff characteristics to neighborhood integer pixels.

A video encoding apparatus of another aspect of the present invention includes a motion compensation prediction step in which motion compensation prediction means generates a predicted image of a coding target frame by dividing the coding target frame into a plurality of blocks, generating a prediction reference image that are formed by providing interpolated pixels which are produced by interpolation between integer pixels from integer neighborhood pixels in a predetermined region of a reference frame, and determining a motion vector for the prediction reference image for each of the plurality of blocks. In the motion compensation prediction step, complexity extraction means extracts complexity information which indicates a degree of complexity of movement from the reference frame for each of the plurality of blocks, and predicted image generating means generates the predicted image by using the prediction reference image to which filtering pixels are provided in accordance with the complexity information on the basis of a predetermined rule which increases the number of the filtering pixels which have pixel values produced by applying a low-pass filter of which spectral band-pass in low frequency band is narrow among a plurality of low-pass filters with different high-frequency cutoff characteristics to neighborhood integer pixels.

A video encoding of still another aspect of the present invention causes a computer to function as motion compensation prediction means for generating a predicted image of a coding target frame by dividing the coding target frame into a plurality of blocks, generating a prediction reference image that are formed by providing interpolated pixels which are produced by interpolation between integer pixels from integer neighborhood pixels in a predetermined region of a reference frame, and determining a motion vector for the prediction reference image for each of the plurality of blocks. The motion compensation prediction means has: complexity extraction means for extracting complexity information which indicates a degree of complexity of movement from the reference frame for each of the plurality of blocks; and predicted image generating means for generating the predicted image by using the prediction reference image to which filtering pixels are provided in accordance with the complexity information on the basis of a predetermined rule which increases the number of the filtering pixels which have pixel values produced by applying a low-pass filter of which spectral band-pass in low frequency band is narrow among a plurality of low-pass filters with different high-frequency cutoff characteristics to neighborhood integer pixels.

According to the abovementioned present invention, the complexity information indicating the degree of complexity of movement with respect to the reference frame is extracted for each of a plurality of blocks into which the coding target frame is divided. The number of filtering pixels which are given pixel values obtained by applying low-pass filters each of which spectral band-pass in low frequency band is narrow among a plurality of low-pass filters with different high-frequency cutoff characteristics in the prediction reference image is increased in accordance with the degree of complexity specified by such complexity information. Namely, in the case of blocks in which the variation from the reference frame is small, the predicted image is generated by using the prediction reference image with high resolution in which the number of filtering pixels is reduced, so that the precision of the motion compensation prediction is improved; accordingly, the redundancy is reduced. On the other hand, in the case of blocks in which the variation from the reference frame is large, the predicted image are generated by using the prediction reference image in which the number of filter pixels is increased. Accordingly, the difference between the predicted image and the processing target block is reduced. As a result, the redundancy is reduced. As described above, since the number of filtering pixels is flexibly altered in accordance with the variation from the reference frame for each block of the coding target frame, the encoding efficiency is improved.

In the present invention, the complexity extraction means can use an absolute value of a differential motion vector of a block surrounding the block for which the complexity information is to be extracted as the complexity information.

Furthermore, in the present invention, in the present invention, conversion means converts predicted residual difference image produced by calculating a difference between the coding target frame and the predicted image into a set of coefficients on the basis of a predetermined conversion rule. In this case, the complexity extraction means can use the numbers of non-zero coefficients among the coefficients in a block surrounding the blocks for which the complexity information is to be extracted as the complexity information.

Furthermore, in the present invention, the complexity extraction means can use an absolute value of a differential motion vector of the blocks for which complexity information is to be extracted as the complexity information.

In addition, a video decoding apparatus of the present invention comprises motion compensation prediction means for generating a prediction reference image that are formed by providing interpolated pixels which are produced by interpolation between integer pixels from integer neighborhood pixels in a predetermined region of a reference frame, and generating a predicted image by dividing the decoding target frame into a plurality of blocks and performing motion compensation based on a motion vector included in compression data by using the prediction reference image. The motion compensation prediction means has: complexity extraction means for extracting complexity information which indicates a degree of complexity of movement from the reference frame for each of the plurality of blocks; and predicted image generating means for generating the predicted image by using the prediction reference image to which filtering pixels are provided in accordance with the complexity information on the basis of a predetermined rule which increases the number of the filtering pixels which have pixel values produced by applying a low-pass filter of which spectral band-pass in low frequency band is narrow among a plurality of low-pass filters with different high-frequency cutoff characteristics to neighborhood integer pixels.

A video decoding method of another aspect of the present invention includes motion compensation prediction step in which motion compensation prediction means generates a prediction reference image that are formed by providing interpolated pixels which are produced by interpolation between integer pixels from integer neighborhood pixels in a predetermined region of a reference frame, and generates a predicted image by dividing the decoding target frame into a plurality of blocks and performing motion compensation based on a motion vector included in compression data by using the prediction reference image. In the motion compensation prediction step, complexity extraction means extracts complexity information which indicates a degree of complexity of movement from the reference frame for each of the plurality of blocks, and predicted image generating means generates the predicted image by using the prediction reference image to which filtering pixels are provided in accordance with the complexity information extracted by the complexity extraction means on the basis of a predetermined rule which increases the number of the filtering pixels which have pixel values produced by applying a low-pass filter of which spectral band-pass in low frequency band is narrow among a plurality of low-pass filters with different high-frequency cutoff characteristics to neighborhood integer pixels.

A video decoding program of still another aspect of the present invention causes a computer to function as motion compensation prediction means for generating a prediction reference image that are formed by providing interpolated pixels which are produced by interpolation between integer pixels from integer neighborhood pixels in a predetermined region of a reference frame, and generating a predicted image by dividing the decoding target frame into a plurality of blocks and performing motion compensation based on a motion vector included in compression data by using the prediction reference image. The motion compensation prediction means has: complexity extraction means for extracting complexity information which indicates a degree of complexity of movement from the reference frame for each of the plurality of blocks; and predicted image generating means for generating the predicted image by using the prediction reference image to which filtering pixels are provided in accordance with the complexity information extracted by the complexity extraction means on the basis of a predetermined rule which increases the number of the filtering pixels which have pixel values produced by applying a low-pass filter of which spectral band-pass in low frequency band is narrow among a plurality of low-pass filters with different high-frequency cutoff characteristics to neighborhood integer pixels.

According to the present invention, motion vectors are decoded from compressed data produced by the abovementioned video encoding apparatus or by a computer operated by the abovementioned video encoding program. Furthermore, for each of the plurality of blocks of the decoding target frame, the complexity information indicating the degree of complexity of the movement from the reference frame is extracted. The prediction reference image in which the number of filtering pixels which have pixel values produced by applying low-pass filters each of which spectral band-pass in low frequency band is narrow among a plurality of low-pass filters with different high-frequency cutoff characteristics are increased in accordance with the degree of complexity of the movement specified by such complexity information are produced. The predicted image is produced from the prediction reference image using the abovementioned motion vectors. Accordingly, a video can be restored from the compressed data produced by the abovementioned video encoding apparatus or by a computer operated by the abovementioned video encoding program.

In the abovementioned present invention, the complexity extraction means can use an absolute value of a differential motion vector of a block surrounding the block for which the complexity information is to be extracted as the complexity information.

Furthermore, in the abovementioned present invention, decoding means decodes compression data including compression codes. The compression code is generated by converting predicted residual difference image produced by calculating a difference between the decoding target frame and the predicted image into a set of coefficients on the basis of a predetermined conversion rule and encoding the set of coefficients. In this case, the complexity extraction means can use the numbers of non-zero coefficients among the coefficients in a block surrounding the blocks for which the complexity information is to be extracted as the complexity information.

Furthermore, in the abovementioned present invention, the complexity extraction means can use an absolute value of a differential motion vector of the blocks for which complexity information is to be extracted as the complexity information.

The present invention will be more fully understood from the detailed description given hereinbelow and the attached drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

In the course of the following detailed description, reference will be made to the attached drawings in which.

DESCRIPTION OF THE PREFERRED EMBODIMENTS

Embodiments of the present invention will be described below. Furthermore, in the description relating to the following embodiments, the same symbols are applied to the same or corresponding units in the respective figures in order to facilitate understanding of the description.

First Embodiment

A video encoding apparatus 1 of a first embodiment of the present invention will be described. In physical terms, the video encoding apparatus 1 is a computer comprising a CPU (central processing unit), a memory apparatus called a memory, a storage apparatus called a hard disk and the like. Here, in addition to ordinary computers such as personal computers or the like, the term "computer" also includes portable information terminals such as mobile communications terminals, so that the concept of the present invention can be widely applied to apparatus that are capable of information processing.

Figure 1:
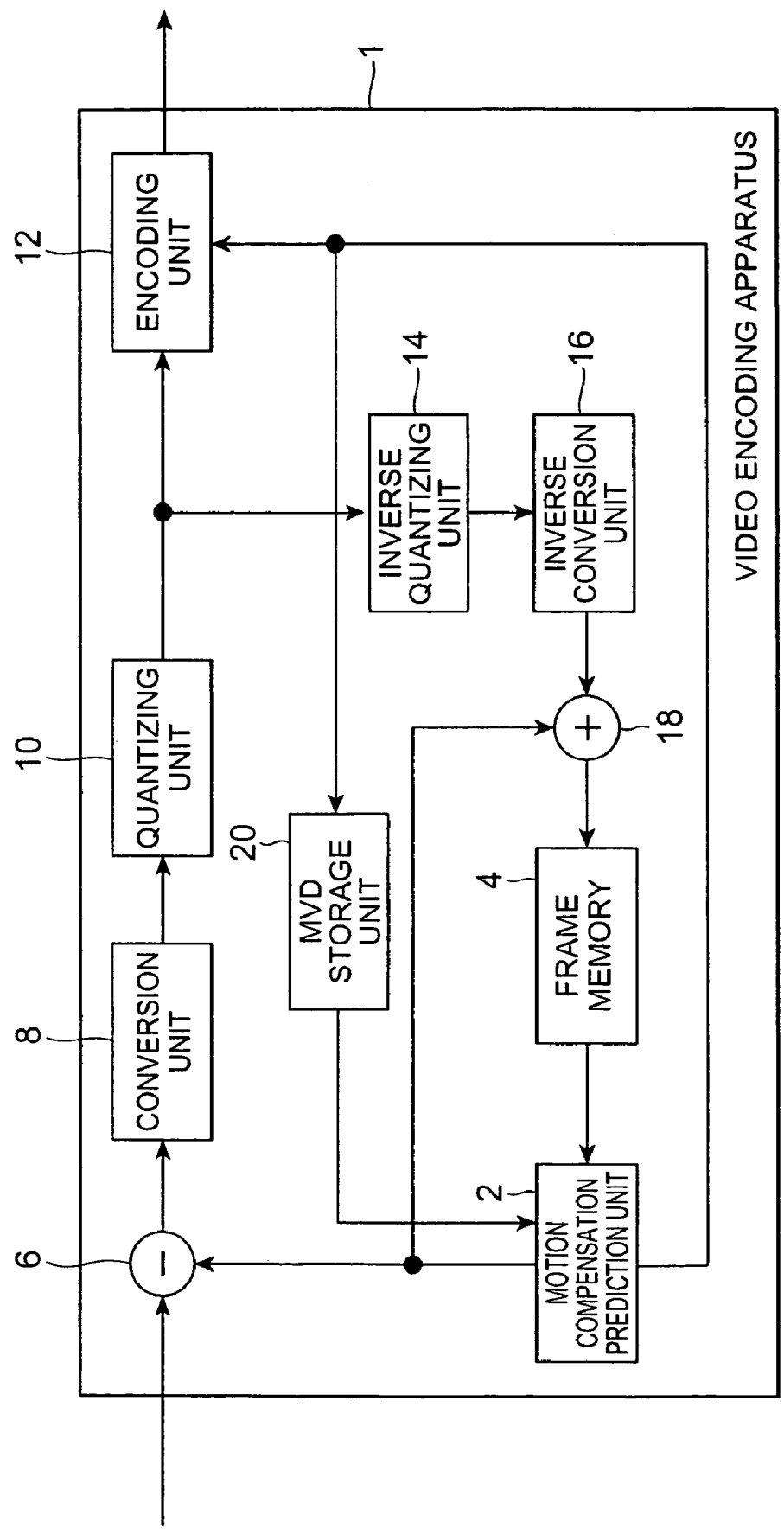
FIG. 1 is a block diagram which shows the functional configuration of a video encoding apparatus of a first embodiment.

Next, the functional configuration of the video encoding apparatus 1 will be described. FIG. 1 is a block diagram which shows the functional configuration of the video encoding apparatus 1. The video encoding apparatus 1 functionally comprises a motion compensation prediction unit 2, a frame memory 4, a subtraction unit 6, a conversion unit 8, a quantizing unit 10, an encoding unit 12, an inverse quantizing unit 14, an inverse conversion unit 16, an addition unit 18, and an MVD storage unit 20.

The motion compensation prediction unit 2 performs motion compensation prediction using a reference frame that is stored in the frame memory 4, thereby determining differential motion vectors (hereafter, a differential motion vector is referred to as "MVD") and producing a predicted image of a coding target frame. The MVD is differential vector formed by a motion vector of a processing target block and intermediate value of motion vectors in blocks surrounding the processing target block. Details of the motion compensation prediction unit 2 will be described later.

The subtraction unit 6 calculates a difference between the predicted image produced by the motion compensation prediction unit 2 and the coding target frame so that the subtraction unit 6 generates a predicted residual difference image.

The conversion unit 8 decomposes the predicted residual difference image into a set of coefficients on the basis of a predetermined conversion rule. For example, DCT (Discrete Cosine Transform) can be used as the predetermined conversion rule. In the case where DCT is used, the predicted residual difference image is converted into a set of DCT coefficients. Furthermore, besides DCT, the matching pursuits method (hereafter referred to as the "MP method") can be used as the predetermined conversion rule. The MP method is a method in which the predicted residual difference image are used as the initial residual component, and processing in which the residual component is decomposed using a basis set on the basis of Equation (1) shown below is repeated. Here, in Equation (1), f indicates the predicted residual image, $R_n f$ indicates the residual component after the n-th repetitive operation, $g_{kn}$ indicates the basis that maximizes the inner product with $R_n f$, and $R_m f$ indicates the residual component after the m-th repetitive operation. That is, according to the MP method, the basis which maximizes an inner product value with a residual component is selected from the basis set, and the residual component is decomposed into the selected basis and a largest inner product value which is a coefficient for multiplication with this basis.

$$f = \sum_{n=0}^{m-1} \langle R_n f, g_{kn} \rangle g_{kn} + R_m f \quad (1)$$

The quantizing unit 10 generates quantized coefficients by applying a quantizing operation to the coefficients generated by decomposing the predicted residual image by the conversion unit 8.

The encoding unit 12 generates a compression code that is obtained by encoding the MVD produced by the motion compensation prediction unit 2. Furthermore, the encoding unit 12 generates a compression code that is obtained by encoding the quantized coefficients produced by the quantizing unit 10. The encoding unit 12 produces compressed data that contains these compression codes. For example, entropy coding such as arithmetic coding can be used for this encoding processing.

The inverse quantizing unit 14, inverse conversion unit 16 and addition unit 18 are units that perform processing that is used to store the reference frame in the frame memory 4. The inverse quantizing unit 14 inversely quantizes the quantized coefficients that have been obtained by the quantizing unit 10. Using the coefficients generated by the inverse quantizing unit 14, the inverse conversion unit 16 performs conversion processing that is the inverse of the conversion processing performed by the conversion unit 8, thereby restoring the predicted residual image. The addition unit 18 produces a reference frame by adding the predicted image of the reference frame and the predicted residual image restored by the inverse conversion unit 16. The reference frame is stored in the frame memory 4 as described above, and is used in the processing performed by the motion compensation prediction unit 2 that generates a predicted image of a next coding target frame.

The MVD storage unit 20 stores the MVDs that are generated by the motion compensation prediction unit 2. The MVDs stored in the MVD storage unit 20 are used in the processing performed by the motion compensation prediction unit 2 (described later).

Figure 2:
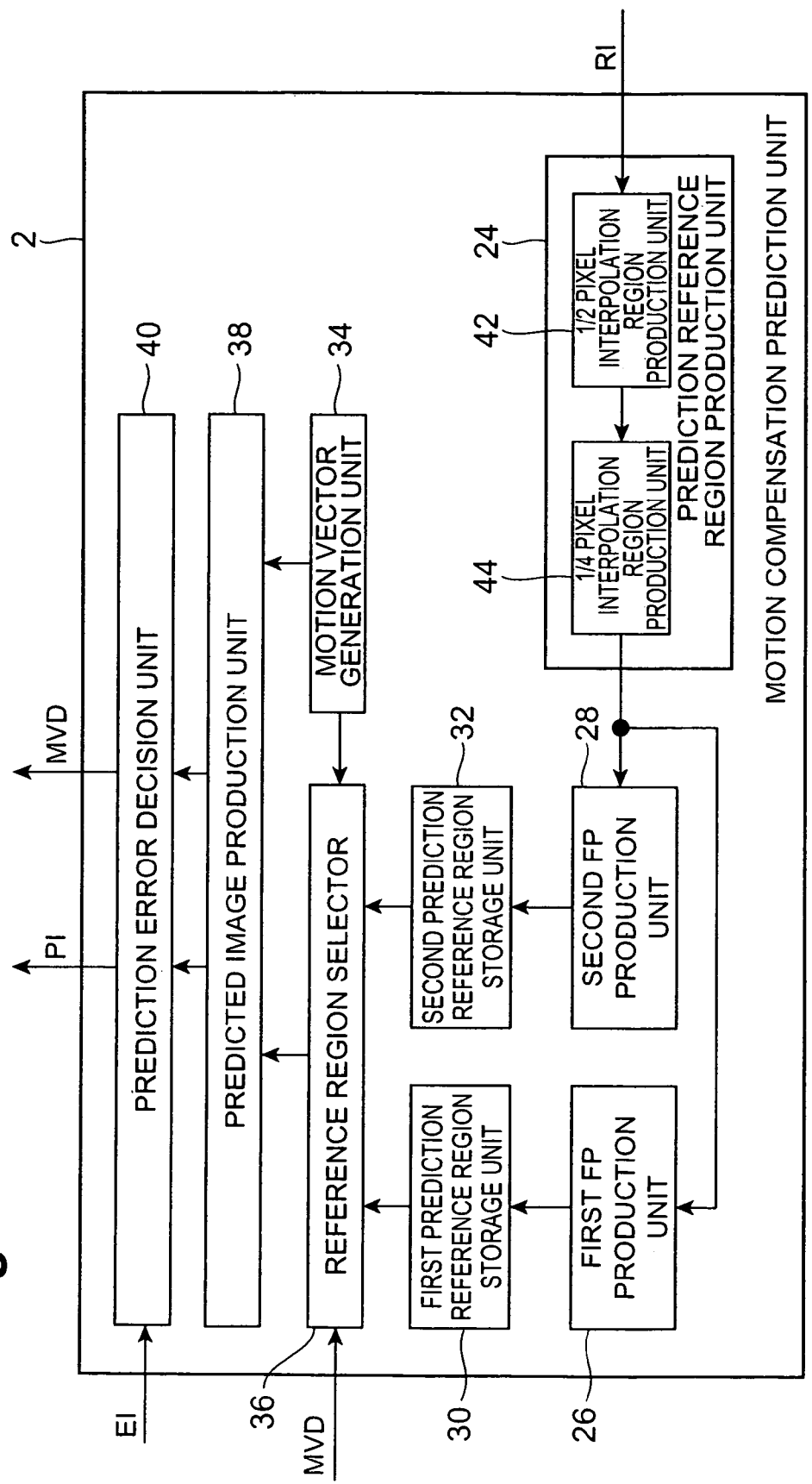
FIG. 2 is a block diagram which shows the configuration of the motion compensation prediction unit provided in the video encoding apparatus of the first embodiment.

The motion compensation prediction unit 2 will be described in detail below. The motion compensation prediction unit 2 divides the coding target frame into a plurality of blocks of a predetermined size. For each of the plurality of blocks, the motion compensation prediction unit 2 detects a motion vector to the reference frame, and uses the reference frame to generate the predicted image of the coding target frame. FIG. 2 is a block diagram which shows the configuration of the motion compensation prediction unit 2. The motion compensation prediction unit 2 comprises a prediction reference region production unit 24, a first FP production unit 26, a second FP production unit 28, a first prediction reference region storage unit 30, a second prediction reference region storage unit 32, a motion vector generation unit 34, a reference region selector 36, a predicted image production unit 38 and a prediction error decision unit 40.

The prediction reference region production unit 24 generates the prediction reference image on the basis of the reference frame RI stored in the frame memory 4. The prediction reference region production unit 24 comprises a 1/2 pixel interpolation region production unit 42 and a 1/4 pixel interpolation region production unit 44.

The 1/2 pixel interpolation region production unit 42 provides interpolated pixels in the 1/2 pixel positions between the integer pixels of the reference frame, and thus converts the reference frame into image with a doubled resolution. Pixel values that are produced by applying a linear filter of (1, −5, 20, 20, −5, 1)/16 to a total of 6 integer pixels (3 neighborhood integer pixels each on the left and right) are given to the interpolated pixels that are located in the 1/2 pixel positions sandwiched between integer pixels that are lined up in the horizontal direction. Pixel values that are produced by applying a linear filter of (1, −5, 20, 20, −5, 1)/16 to a total of 6 integer pixels (3 nearby integer pixels each above and below) are given to the interpolated pixels that are located in the 1/2 pixel positions sandwiched between integer pixels that are lined up in the vertical direction. The mean values of the pixel values of interpolated pixels in the 1/2 pixel positions that are adjacent in the horizontal direction are given as pixel values to the interpolated pixels that are located at equal distances from four neighborhood integer pixels.

The 1/4 pixel interpolation region production unit 44 further provides interpolated pixels to the image with a doubled resolution produced by the 1/2 pixel interpolation region production unit 42, thus producing an image in which the resolution of the reference frame is quadrupled. Values that are linearly interpolated from 2 pixels among the neighborhood integer pixels and interpolated pixels in the 1/2 pixel positions are given to these interpolated pixels as pixel values. The reference frame is converted into the image with a quadrupled resolution by the 1/2 pixel interpolation region production unit 42 and 1/4 pixel interpolation region production unit 44, and the image is output to the first FP production unit 26 and second FP production unit 28 as the prediction reference image.

The first FP production unit 26 produces a first prediction reference image in which pixel values produced by applying a low-pass filter of which spectral band-pass in low frequency band is narrow to the prediction reference image are given to the (3/4, 3/4) pixel positions. The first FP production unit 26 stores the first prediction reference image in the first prediction reference region storage unit 30. Hereafter, in the present specification, each of the interpolated pixels provided with pixel values obtained by applying low-pass filters each of which spectral band-pass in low frequency band is narrow to integer pixels will be referred to as "FP (funny position)". Furthermore, low-pass filters each of which spectral band-pass in low frequency band is narrow will be referred to as "low-pass filters".

Figure 3:
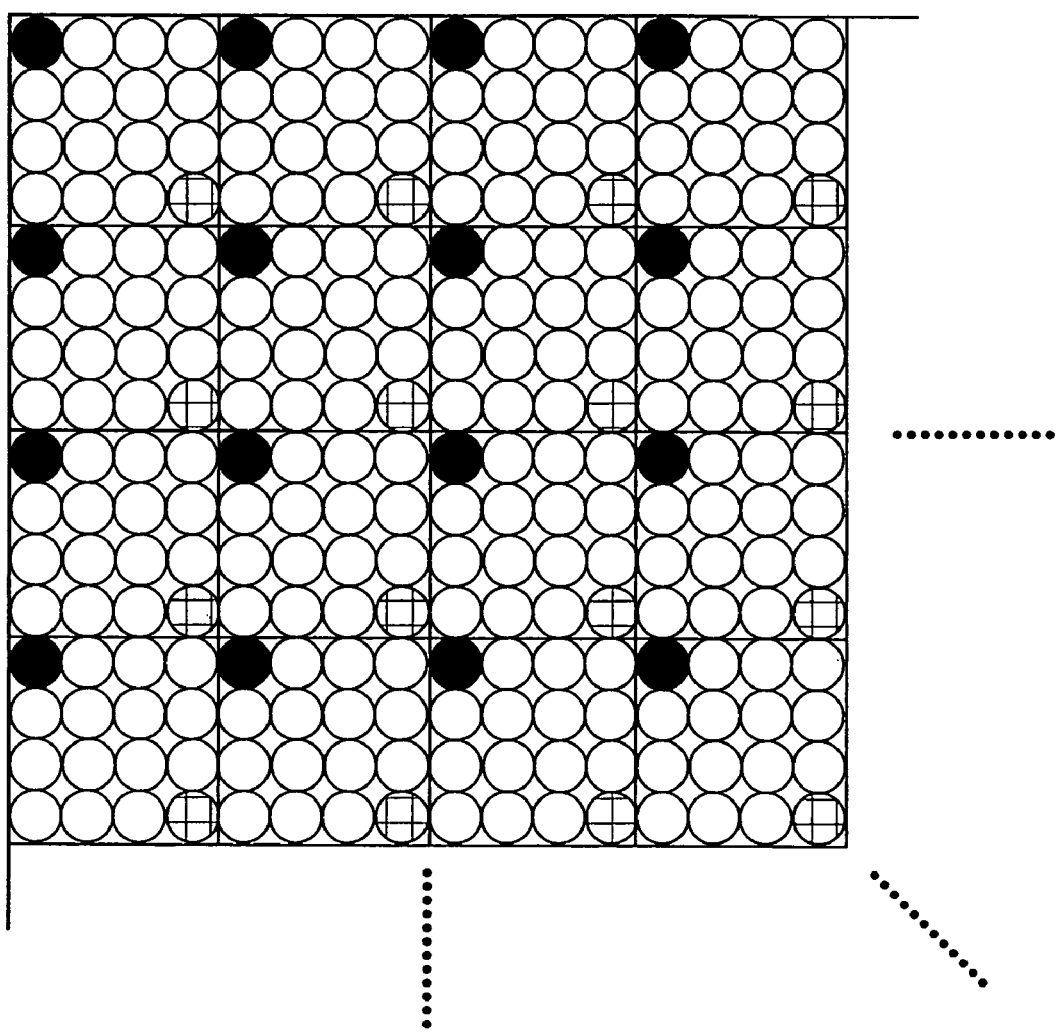
FIG. 3 is a schematic view of an example of a first prediction reference image generated by a first FP production unit provided in the video encoding apparatus of the first embodiment.

FIG. 3 is a schematic view of an example of a first prediction reference image generated by a first FP production unit provided in the video encoding apparatus of the first embodiment. The circles in FIG. 3 indicate pixels. In FIG. 3, the solid black circles indicate integer pixels, and the empty circles indicate interpolated pixels. Furthermore, the circles with lattice-form hatching indicate the FPs. The first FP production unit 26 provides a pixel value determined by adding values which are calculated by multiplying each of the pixel values of four neighborhood integer pixels which are located directly under the FP and lined up in the horizontal direction by a coefficient of 1/2 to each of the FPs.

Figure 4:
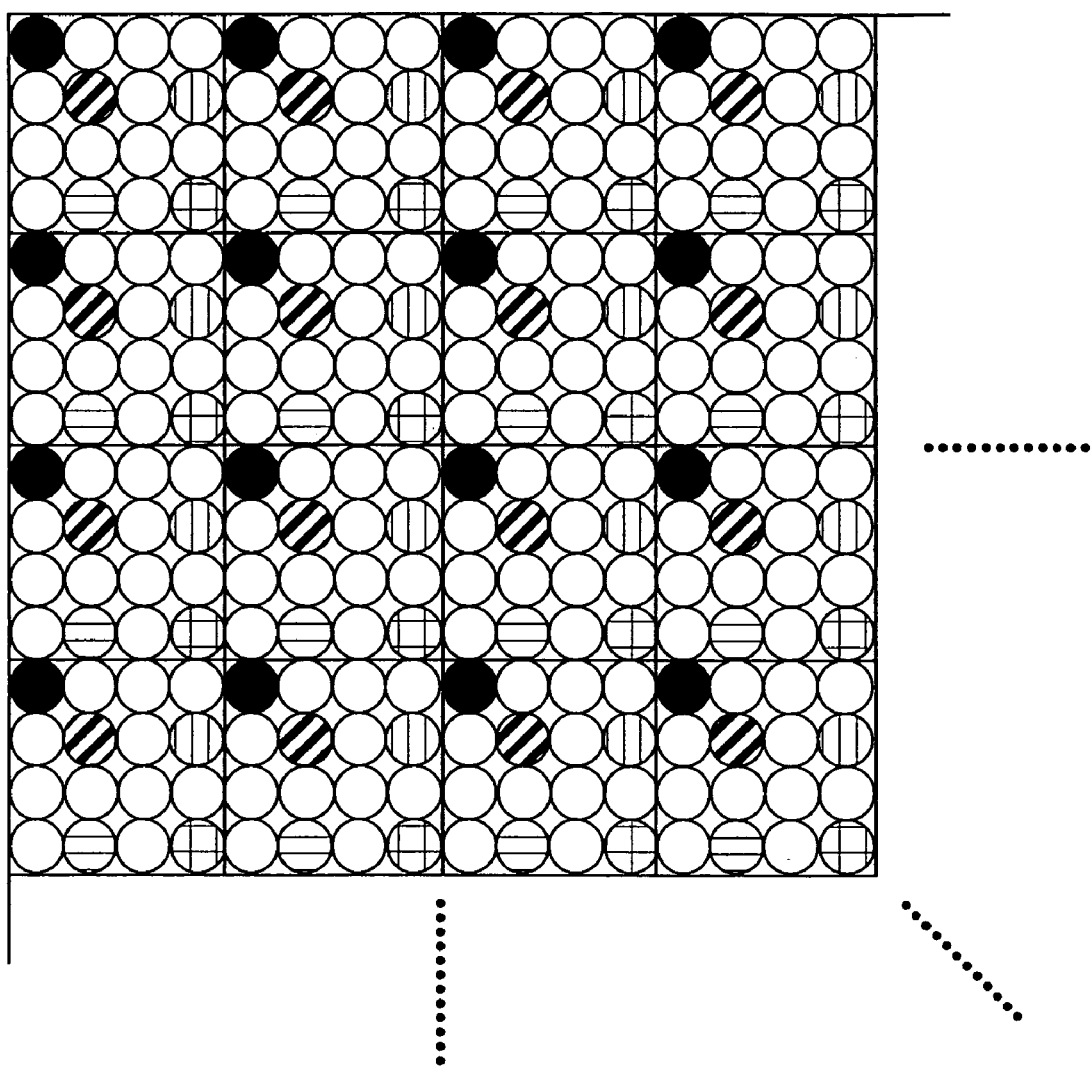
FIG. 4 is a schematic view of an example of a second prediction reference image produced by a second FP production unit provided in the video encoding apparatus of the first embodiment.

The second FP production unit 28 produces a second prediction reference image which is provided with a greater number of FPs than in the case of the first FP production unit. The second FP production unit 28 stores the second prediction reference image in the second prediction reference region storage unit 32. FIG. 4 is a schematic view of an example of a second prediction reference image produced by a second FP production unit provided in the video encoding apparatus of the first embodiment. In FIG. 4 as in FIG. 3, circles indicate pixels. In FIG. 4, the solid black circles indicate integer pixels, the empty circles indicate interpolated pixels, and the circles shown with hatching indicate FPs.

The second FP production unit 28 gives pixel values produced as described below to the FPs. A pixel value obtained by applying an one-dimensional low-pass filter with coefficients of (4/32, 24/32, 4/32) to three neighborhood integer pixels which are lined up in the horizontal and located in direction immediately above the FP is given to each of the FP at the (1/4, 1/4) pixel positions shown with diagonal hatching in FIG. 4. A pixel value obtained by applying an one-dimensional low-pass filter with coefficients of (−2/32, 1/32, 17/32, 17/32, 1/32, −2/32) to six neighborhood integer pixels which are lined up in the horizontal direction and located immediately above the FP is given to each of the FPs at the (3/4, 1/4) pixel positions shown with vertical hatching. A pixel values obtained by applying an one-dimensional low-pass filter with coefficients of (2/32, 6/32, 8/32, 8/32, 2/32) to five neighborhood integer pixels which are lined up in the horizontal direction and located immediately below the FP is given to each of the FPs at the (1/4, 3/4) pixel positions shown with horizontal hatching. A pixel values obtained by applying an one-dimensional low-pass filter with coefficients of (3/32, 13/32, 13/32, 3/32) to four neighborhood integer pixels which are lined up in the horizontal direction and located immediately below the FP is given to each of the FPs in the (3/4, 3/4) pixel positions shown with lattice-form hatching.

The motion vector generation unit 34 generates motion vectors from a processing target block of the coding target frame to positions where block matching for the motion compensation is performed in predetermined regions in the first or second prediction reference images, and outputs these motion vectors to the reference region selector 36 and predicted image production unit 38. For example, the motion vector generation unit 34 generates motion vectors from (−16, −16) to (16, 16) centered on the same position as the processing target block of the coding target frame.

The reference region selector 36 acquires MVDs in the blocks surrounding the processing target block from the MVD storage unit 20, and uses the absolute values of these MVDs as complexity information that indicates the degree of complexity of the movement of the processing target block. Since the MVD is a differential vector between the motion vector for a certain block and the motion vectors for blocks surrounding the certain block, the absolute value of MVDs of blocks surrounding the processing target block with complex movement is large. On the other hand, the absolute value of MVDs of blocks surrounding the processing target block with flat movement is small. Accordingly, the complexity of the movement of the processing target block from the reference frame can be expressed by the absolute value of the MVDs of blocks surrounding the processing target block.

In cases where the absolute values of the MVDs in blocks surrounding the processing target blocks is smaller than a predetermined value, the reference region selector 36 decides that the movement of the processing target block is not complex, and then decides that the first prediction reference image stored in the first prediction reference region storage unit 30 should be selected as the prediction reference image used for motion compensation prediction. On the other hand, in cases where the absolute value of the MVDs in blocks surrounding the processing target block is equal to or greater than the predetermined value, the reference region selector 36 decides that the movement of the processing target block is complex, and then decides that the second prediction reference image stored in the second prediction reference region storage unit 32 should be selected as the prediction reference image used for motion compensation prediction. The reference region selector 36 outputs the decision to the predicted image production unit 38.

On the basis of the decision results from the reference region selector 36, the predicted image production unit 38 selects either the first prediction reference image or second prediction reference image. The predicted image production unit 38 takes the images of blocks of portions specified by the motion vectors output by the motion vector generation unit 34 from the selected image as predicted image candidates, and establishes a correspondence between these candidates and the abovementioned motion vectors. Such predicted image candidates are determined for all of a plurality of motion vectors generated by the motion vector generation unit 34, so that a plurality of sets each of which is constituted by the predicted image candidate and the motion vector corresponding to the candidate are produced.

The prediction error decision unit 40 selects the predicted image candidate that show the least error with respect to the processing target block in the coding target frame EI among the predicted image candidates produced by the predicted image production unit 38, and takes the selected candidate as the predicted image PI of the processing target block. Furthermore, the prediction error decision unit 40 takes the motion vector that have been associated with the selected candidate as the motion vector the processing target block. The predicted images PI are determined for all of the blocks of the coding target frame EI. These predicted images are processed as described above by the subtraction unit 6. Furthermore, motion vectors are also determined for all of the blocks of the coding target frame EI, and these motion vectors are converted into MVDs by the prediction error decision unit 40. Such MVDs are output to the encoding unit 12 by the prediction error decision unit 40.

Figure 5:
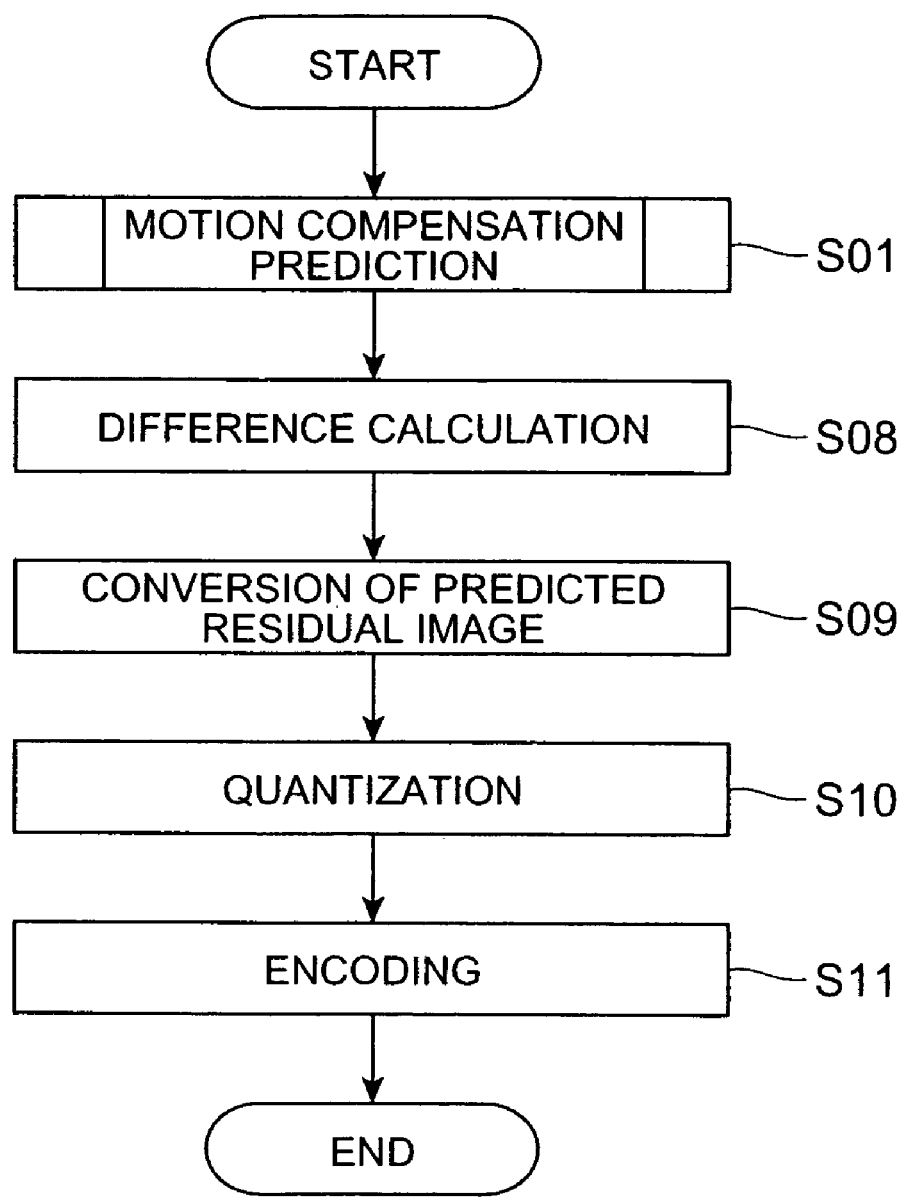
FIG. 5 is a flow chart which shows a video encoding method of a first embodiment.
Figure 6:
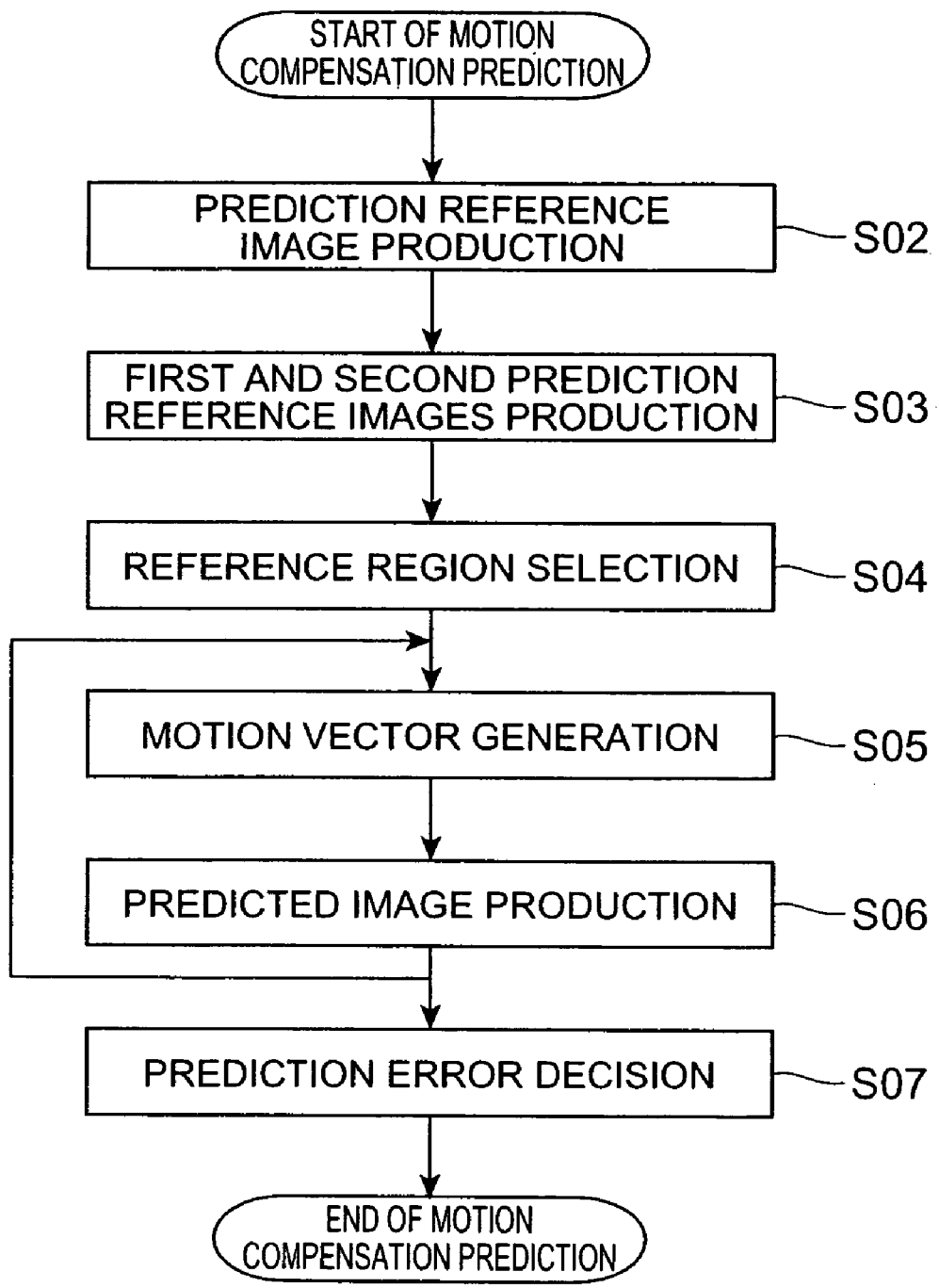
FIG. 6 is a flow chart relating to motion compensation prediction in the video encoding method of the first embodiment.

Next, the operation of the video encoding apparatus 1 will be described. At the same time, a video encoding method of a first embodiment of the present invention will be described. FIG. 5 is a flow chart which shows a video encoding method of a first embodiment. Furthermore, FIG. 6 is a flow chart relating to motion compensation prediction in this video encoding method.

In the video encoding method of the first embodiment, as shown in FIG. 5, motion compensation prediction is first performed by the motion compensation prediction unit 2 (step S01). In the motion compensation prediction, as shown in FIG. 6, prediction reference image is first produced by the prediction reference region production unit 24 (step S02). The prediction reference image is produced on the basis of the reference frame. The reference frame is converted into an image with a quadrupled resolution by the 1/2 pixel interpolation region production unit 42 and 1/4 pixel interpolation region production unit 44, and the resulting image with a quadrupled resolution is taken as prediction reference image.

As described above, the prediction reference image is converted into the first prediction reference image by the first FP production unit 26, and is stored in the first prediction reference region storage unit 30. Furthermore, the prediction reference image is converted into the second prediction reference image by the second FP production unit 28, and is stored in the second prediction reference region storage unit 32 (step S03).

Next, the degree of complexity of the processing target block is determined by the reference region selector 36 using the MVDs of blocks surrounding the processing target block. This degree of complexity is compared with the predetermined value by the reference region selector 36, and a decision that selects either the first prediction reference image or second prediction reference image is made on the basis of the results of this comparison (step S04).

Next, the motion vector is generated by the motion vector generation unit 34, and the motion vector is output to the predicted image production unit 38 (step S05). Then, on the basis of the degree of complexity of the movement of the processing target block, the first prediction reference image or the second prediction reference image are selected by the reference region selector 36. Image of the region specified by the abovementioned motion vector in the image selected by the reference region selector 36 is extracted by the predicted image production unit 38, and is taken as predicted image candidate. The predicted image candidate is associated with the motion vector (step S06).

The processing of step S05 and step S06 is repeated for a region in the prediction reference image which is predetermined for the processing target block, and the candidate showing the least error with respect to the processing target block among the plurality of predicted image candidates are extracted by the prediction error decision unit 40 as the predicted image of the processing target block. Furthermore, the motion vector that is associated with the predicted image candidate thus extracted is extracted by the prediction error decision unit 40 as the motion vector of the processing target block (step S07). After the processing of steps S02 through S07 has been repeated for all of the blocks of the coding target frame, predicted images of the coding target frame are produced and output to the subtraction unit 6; furthermore, motion vectors of all of the blocks are converted into MVDs, and these MVDs are output to the encoding unit 12.

Returning to FIG. 5, calculation of the differences between the predicted images output by the motion compensation prediction unit 2 and the coding target frame is performed by the subtraction unit 6 so that predicted residual image are produced (step S08). The predicted residual image is decomposed into a set of coefficients by the conversion unit 8 (step S09). The coefficients are respectively quantized by the quantizing unit 10, and are thus converted into quantized coefficients (step S10). Then, the abovementioned MVD and the quantized coefficients are encoded by the encoding unit 12, so that compressed data is produced (step S11).

Figure 7:
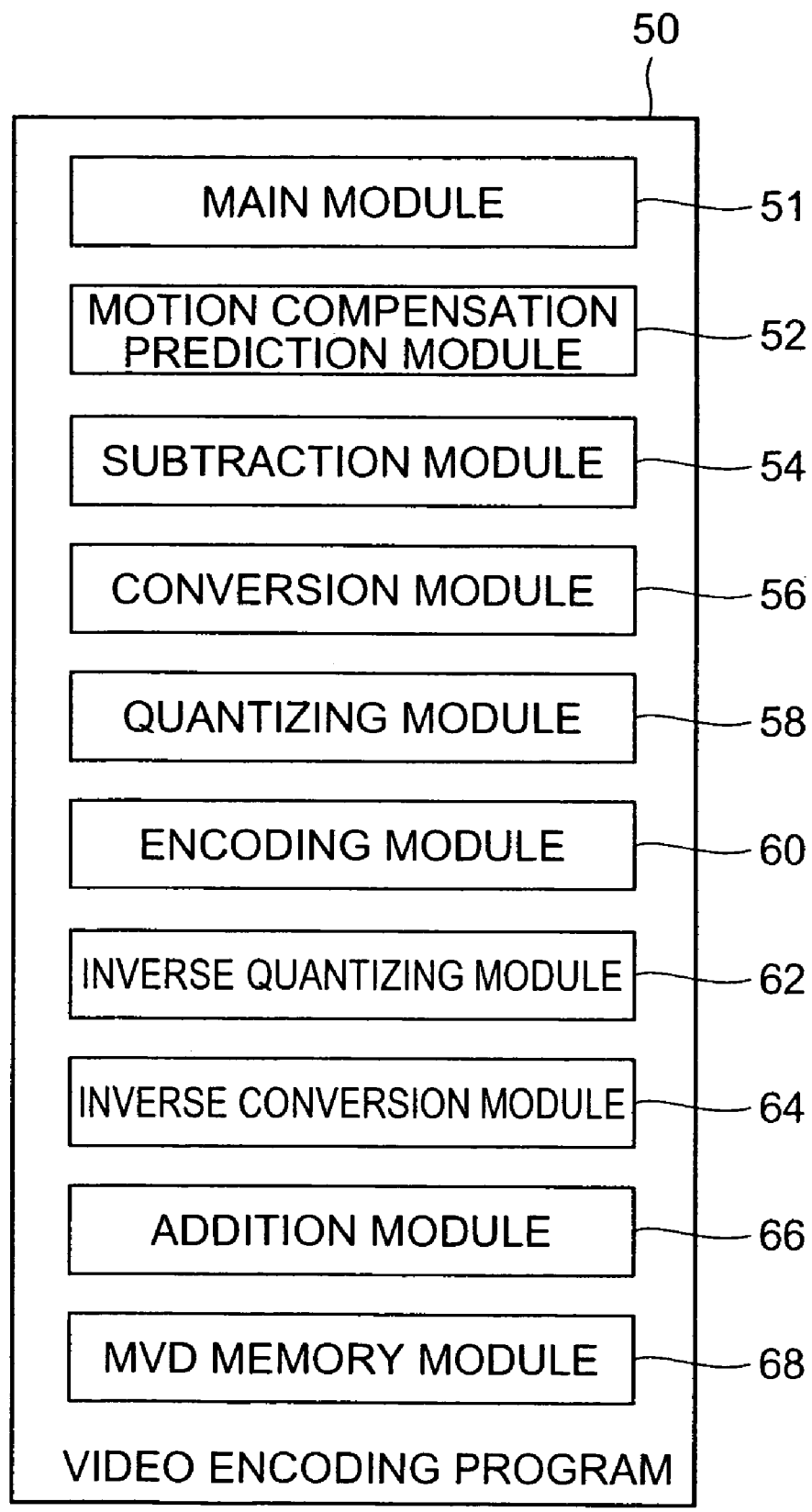
FIG. 7 is a block diagram which shows the configuration of a video encoding program relating to a first embodiment.
Figure 8:
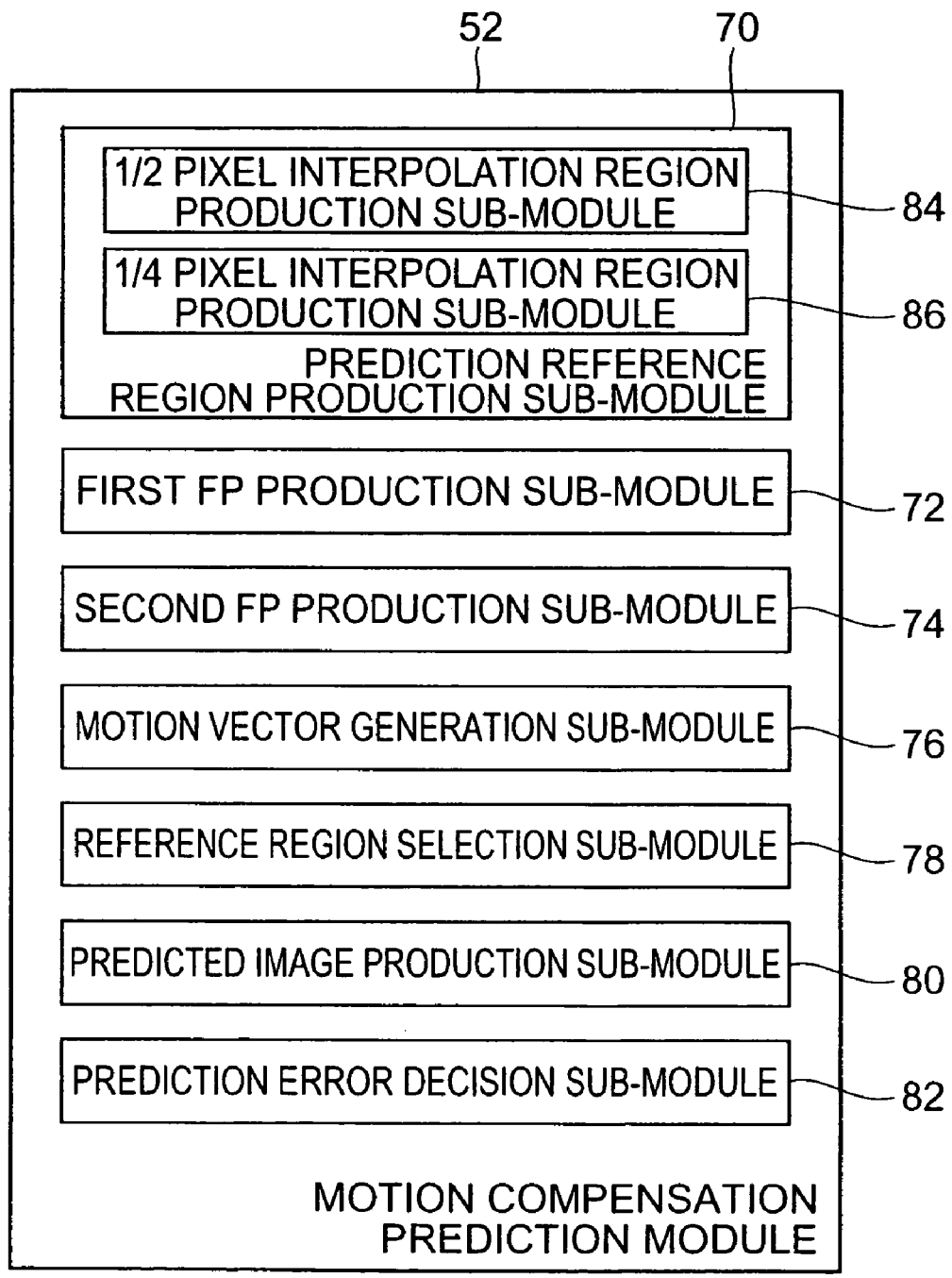
FIG. 8 is a block diagram which shows the configuration of the motion compensation prediction module in the video encoding program of the first embodiment.

Next, a video encoding program 50 that causes a computer to function as the video encoding apparatus 1 will be described. FIG. 7 is a block diagram which illustrates the configuration of the video encoding program 50. The video encoding program 50 comprises a main module 51 that controls the processing, a motion compensation prediction module 52, a subtraction module 54, a conversion module 56, a quantizing module 58, an encoding module 60, an inverse quantizing module 62, an inverse conversion module 64, an addition module 66, and an MVD memory module 68. As is shown in FIG. 8, which is a diagram that illustrates the configuration of the motion compensation prediction module 52, the motion compensation prediction module 52 comprises a prediction reference region production sub-module 70, a first FP production sub-module 72, a second FP production sub-module 74, a motion vector generation sub-module 76, a reference region selection sub-module 78, a predicted image production sub-module 80, and a prediction error decision module 82. The prediction reference region production sub-module 70 comprises a 1/2 pixel interpolation region production sub-module 84 and a 1/4 pixel interpolation region production sub-module 86.

The functions that are realized in a computer by the motion compensation prediction module 52, subtraction module 54, conversion module 56, quantizing module 58, encoding module 60, inverse quantizing module 62, inverse conversion module 64, addition module 66, MVD memory module 68, prediction reference region production sub-module 70, first FP production sub-module 72, second FP production sub-module 74, motion vector generation sub-module 76, reference region selection sub-module 78, predicted image production sub-module 80, prediction error decision module 82, 1/2 pixel interpolation region production sub-module 84 and 1/4 pixel interpolation region production sub-module 86 are respectively the same as the motion compensation prediction unit 2, subtraction unit 6, conversion unit 8, quantizing unit 10, encoding unit 12, inverse quantizing unit 14, inverse conversion unit 16, addition unit 18, MVD storage unit 20, prediction reference region production unit 24, first FP production unit 26, second FP production unit 28, motion vector generation unit 34, reference region selector 36, predicted image production unit 38, prediction error decision unit 40, 1/2 pixel interpolation region production unit 42 and 1/4 pixel interpolation region production unit 44. The video encoding program 50 is provided, for example, by recording media such as CD-ROM, DVD, ROM, or by semiconductor memories. The video encoding program 50 may be a program provided as computer data signals over a carrier wave through a network.

The action and effect of the video encoding apparatus 1 of the first embodiment will be described below. In the video encoding apparatus 1, the absolute values of MVDs surrounding blocks are extracted for each of a plurality of blocks into which the coding target frame is divided. The absolute values of these MVD express the degree of complexity of the movement from the reference frame for the processing target block. In the video encoding apparatus 1, in cases where the absolute values of the MVDs in blocks surrounding the processing target block are smaller than a predetermined value, the predicted image is produced using the first prediction reference image produced by the first FP production unit 26. Namely, in cases where the movement of the processing target block from the reference frame is not complex, the predicted image is extracted from the first prediction reference image in which the number of FPs is small. Accordingly, for the processing target block in which the movement from the reference frame is not complex, the encoding efficiency is improved by increasing the resolution. On the other hand, in cases where the absolute values of the MVDs in blocks surrounding the processing target are equal to or greater than the predetermined value, the predicted image is produced using the second prediction reference image produced by the second FP production unit 28. Namely, in cases where the movement of the processing target block is complex, the predicted image is extracted from the second prediction reference image in which the number of FPs is large. Accordingly, for the processing target block in which the movement from the reference frame is complex, since the difference between the predicted image and the image of the processing target block is small as a result of the predicted image being extracted from second prediction reference image in which the number of FPs is large, the redundancy is reduced. Thus, as a result of predicted images being produced from first prediction reference image and second prediction reference image in a flexible manner in accordance with variation of the processing target block from the reference frame, the encoding efficiency is improved.

Figure 9:
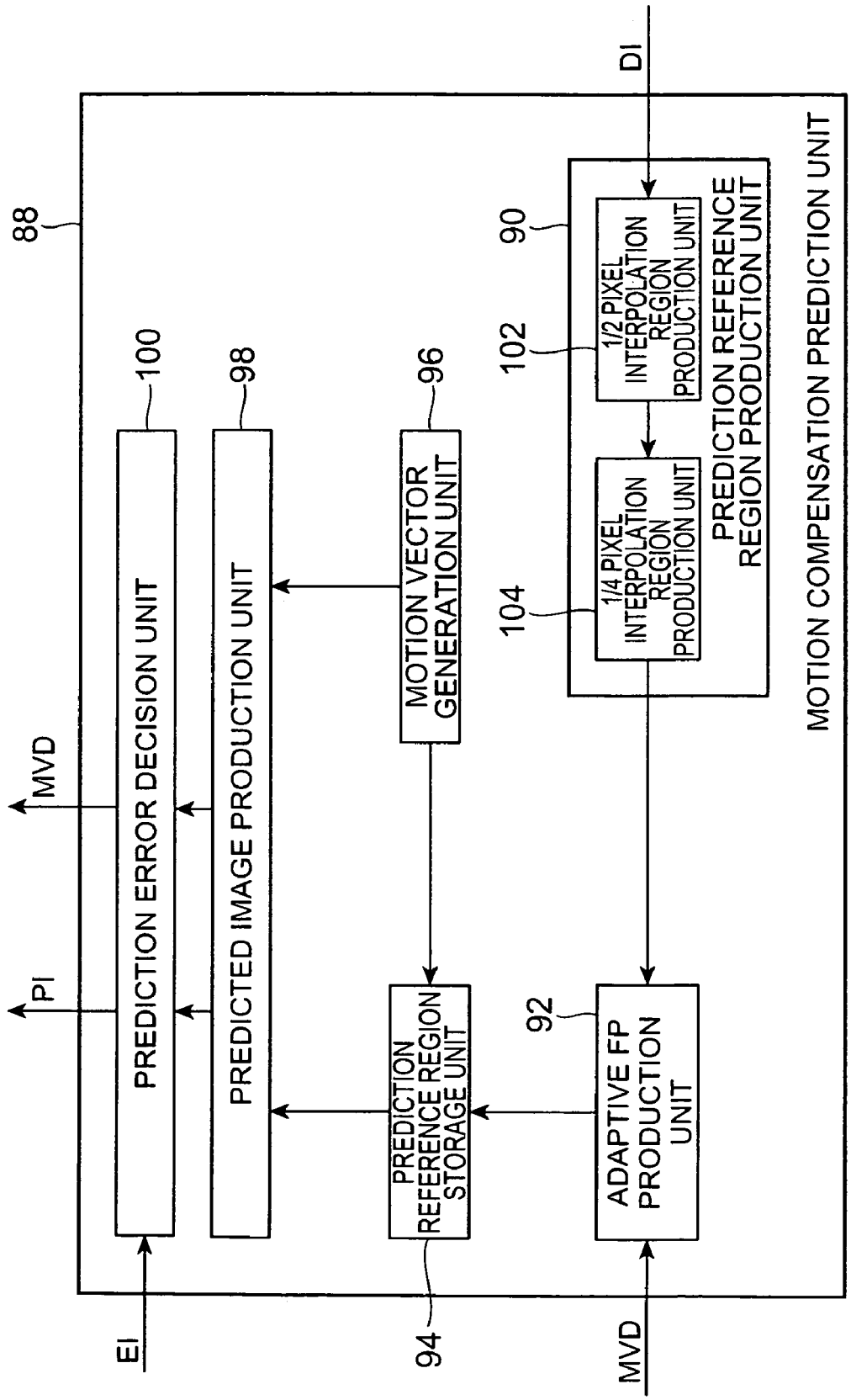
FIG. 9 is a block diagram which shows the configuration of an alternative motion compensation prediction unit in the video encoding apparatus of the first embodiment.

Note that, in the abovementioned motion compensation prediction unit 2, the prediction reference image for the reference frame as a whole were produced when motion compensation prediction is performed. However, it would also be possible to produce prediction reference image only for a predetermined region in the reference frame in accordance with the positions of the processing target blocks, i. e., region in which block matching is to be performed in order to detect motion vector. In this case, the prediction reference image is newly produced each time that the processing target block is switched. FIG. 9 is a diagram which shows the configuration of an alternative motion compensation prediction unit in the video encoding apparatus of the first embodiment. This motion compensation prediction unit 88 can be substituted for the motion compensation prediction unit 2 of the video encoding apparatus 1.

As is shown in FIG. 9, the motion compensation prediction unit 88 comprises a prediction reference region production unit 90, an adaptive FP production unit 92, a prediction reference region storage unit 94, a motion vector generation unit 96, a predicted image production unit 98, and a prediction error decision unit 100.

The prediction reference region production unit 90 produces a prediction reference image on the basis of image of a predetermined region in the reference frame corresponding to the processing target block in which motion compensation prediction is to be performed. Such a predetermined region is a region in which block matching is to be performed in order to detect the motion vector of the processing target block.

The prediction reference region production unit 90 comprises a 1/2 pixel interpolation region production unit 102 and a 1/4 pixel interpolation region production unit 104. The 1/2 pixel interpolation region production unit 102 converts the image of the abovementioned predetermined region in the reference frame into an image with a doubled resolution. Furthermore, the 1/4 pixel interpolation region production unit produces a prediction reference image in which the image with a doubled resolution is further converted into an image with a quadrupled resolution. The abovementioned increase in resolution is realized by processing that is the same as the processing performed by the abovementioned 1/2 pixel interpolation region production unit 42 and 1/4 pixel interpolation region production unit 44.

The adaptive FP production unit 92 acquires MVDs in blocks surrounding the processing target block from the MVD storage unit 20. In cases where the absolute values of the MVD are smaller than a predetermined value, the adaptive FP production unit 92 converts the (3/4, 3/4) pixel positions of the prediction reference image as FPs. The production processing of such FPs is the same as the processing performed by the first FP production unit 26. On the other hand, in cases where the absolute values of the abovementioned MVD are equal to or greater than the predetermined value, the adaptive FP production unit 92 provides FP to the prediction reference image by the same processing as that of the second FP production unit 28. The prediction reference image provided with FPs by the adaptive FP production unit 92 is stored in the prediction reference region storage unit 94.

The motion vector generation unit 96 generates motion vectors from the processing target block to the positions of the prediction reference image for which matching is to be performed, and outputs these motion vectors to the predicted image production unit 98. The motion vectors are generated to realize of block matching with the entire region of prediction reference image.

The predicted image production unit 98 extracts an image of a region which is specified by the motion vector output by the motion vector generation unit 96 among the prediction reference images stored in the prediction reference region storage unit 94, as a candidate for the predicted image, and establishes a correspondence between the predicted image candidate and the motion vector. Such a predicted image candidate is produced in correspondence with each of the motion vectors generated by the motion vector generation unit 96.

The prediction error decision unit 100 selects the predicted image candidate that show the least error with respect to the processing target block among the predicted images candidates produced by the predicted image production unit 98, and takes the selected candidates as the predicted image PI of the processing target block. Furthermore, the prediction error decision unit 100 takes the motion vector that are associated with the selected predicted image candidate as the motion vector of the processing target block. The predicted images are determined for all of the blocks of the coding target frame EI, and these predicted images PI are then output to the subtraction unit 6. Furthermore, motion vectors are also determined for all of the blocks of the coding target frame EI. These motion vectors are converted into MVDs, and then the MVDs output to the encoding unit 12 by the prediction error decision unit 100.

Figure 10:
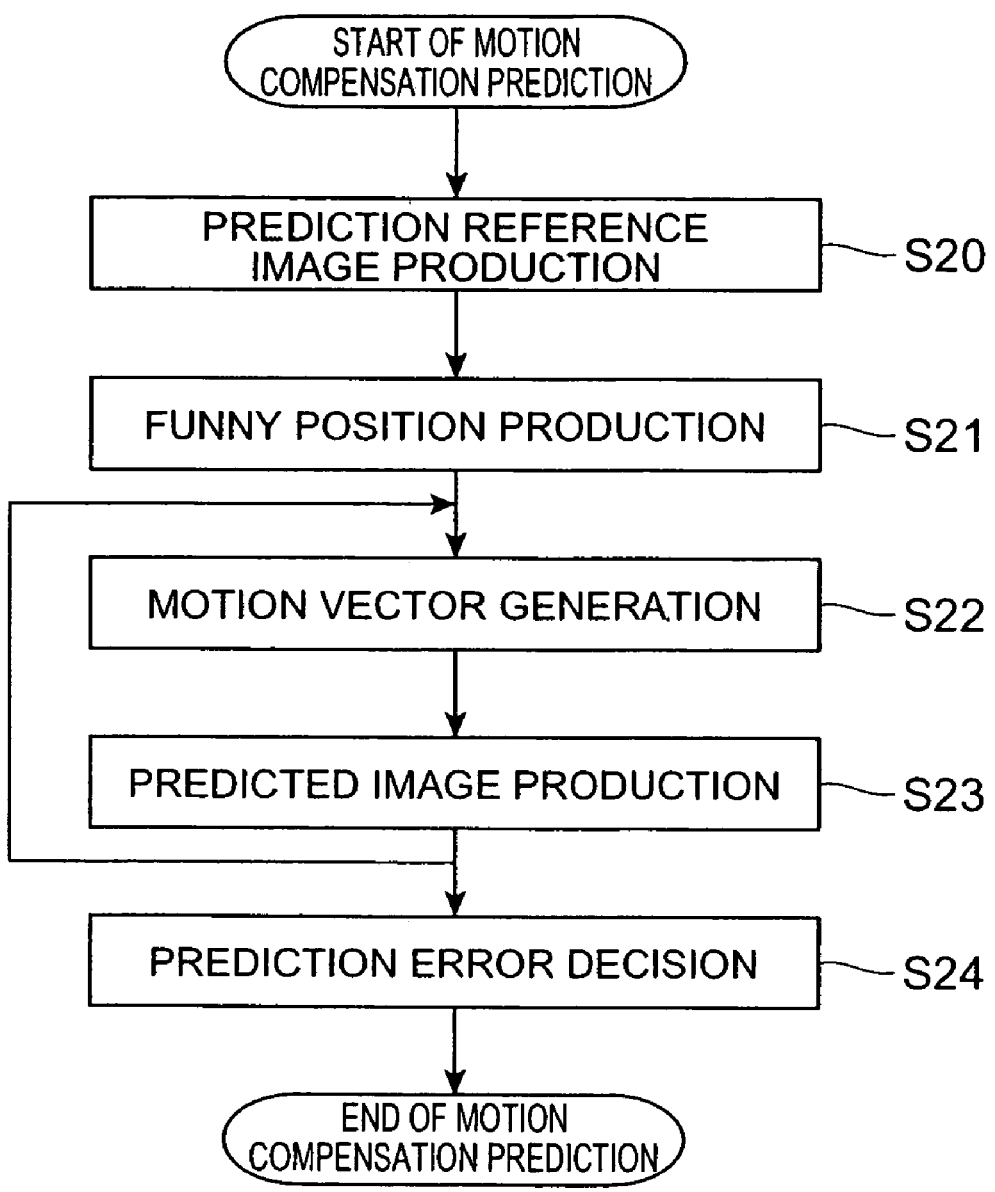
FIG. 10 is a flow chart relating to alternative motion compensation prediction in the video encoding method of the first embodiment.

The operation of the video encoding apparatus 1 in a case where the motion compensation prediction unit 88 is used, and the video encoding method performed by this video encoding apparatus 1, will be described below. Here, only the processing performed by the motion compensation prediction unit 88 that differs from the processing performed by the video encoding apparatus 1 using the motion compensation prediction unit 2 will be described. FIG. 10 is a flow chart relating to alternative motion compensation prediction in the video encoding method of the first embodiment.

In this video encoding method, an image of a predetermined region of the reference frame is first extracted in accordance with the positions of the processing target block. The extracted image is converted into an image with a quadrupled resolution by the prediction reference region production unit 90. The image with a quadrupled resolution is taken as the prediction reference image (step S20).

Next, FPs are provided in the prediction reference image by the adaptive FP production unit 92 (step S21). The adaptive FP production unit 92 changes the number of FP provided in the prediction reference image as described above on the basis of the results of a comparison of the absolute values of the MVDs of the blocks surrounding the processing target block with a predetermined value. The prediction reference image thus provided with FPs is stored in the prediction reference region storage unit 94.

Next, the motion vector generated by the motion vector generation unit 96 is output to the predicted image production unit 98 (step S22). Furthermore, an image of the block specified by the motion vector is extracted from the prediction reference image by the predicted image production unit 98, and the extracted image is taken as a predicted image candidate and associated with the motion vector (step S23). The processing of steps S22 and S23 is repeated while the motion vectors are changed, so that a plurality of predicted image candidates are produced. Furthermore, the candidate showing the least error with respect to the processing target block, among the plurality of predicted image candidates, is selected by the prediction error decision unit 40 as the predicted image of the processing target block. Moreover, the motion vector associated with the selected candidate is extracted as the motion vector of the processing target block by the prediction error decision unit 100 (step S24). The processing of steps S20 through S24 is repeated for all of the blocks of the coding target frame so that predicted images of the coding target frame are produced, and these predicted images are output to the subtraction unit 6. Furthermore, motion vectors relating to all of the blocks are converted into MVDs by the prediction error decision unit 100, and the MVDs are then output to the encoding unit 12.

Figure 11:
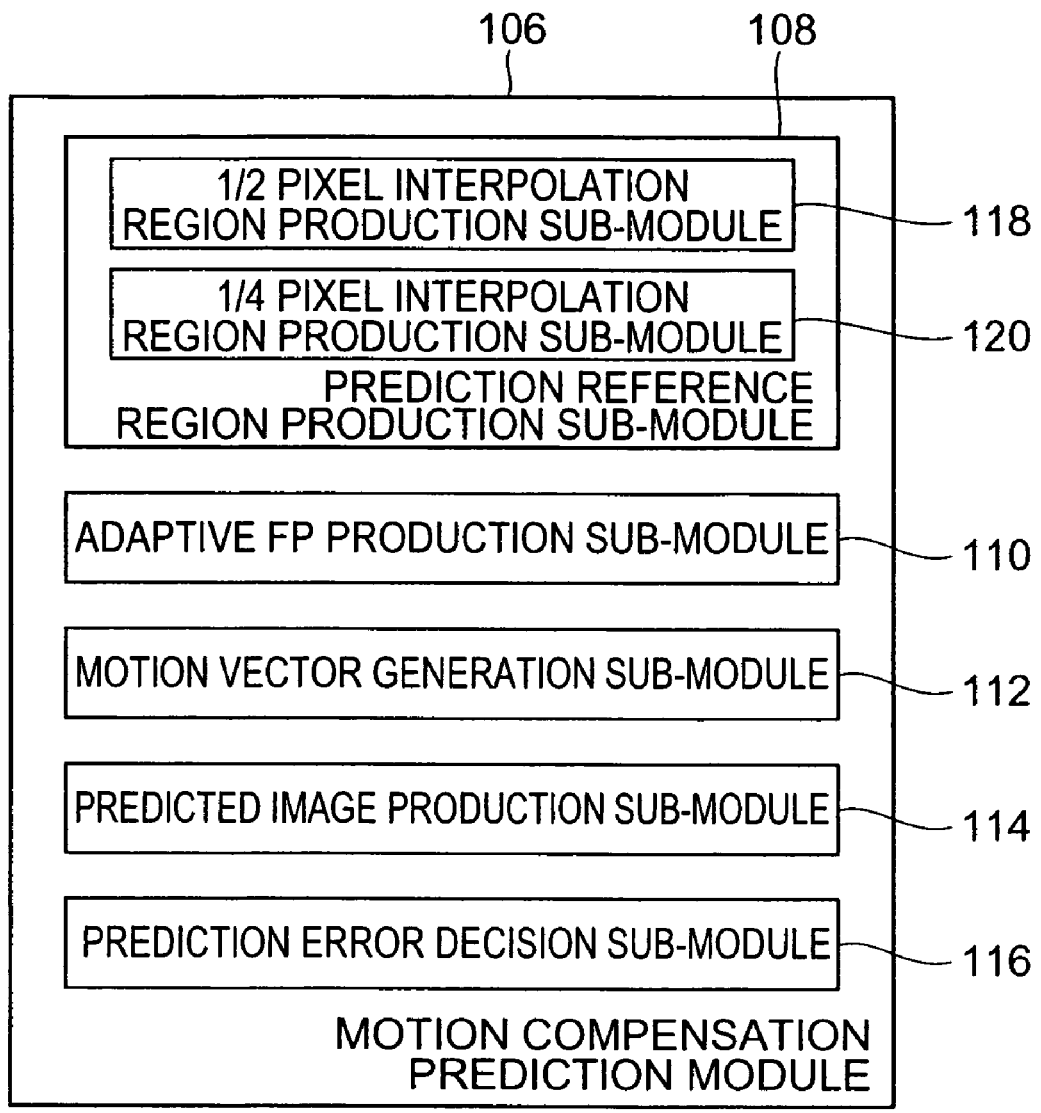
FIG. 11 is a diagram which shows the configuration of an alternative motion compensation prediction module in the video encoding program of the first embodiment.

Next, a video encoding program which is used to cause a computer to function as the video encoding apparatus 1 comprising the motion compensation prediction unit 88 will be described. This video encoding program is constructed by replacing the motion compensation prediction module 52 in the video encoding program 50 with the motion compensation prediction module 106 described below. FIG. 11 is a diagram which shows the configuration of an alternative motion compensation prediction module in the video encoding program of the first embodiment.

The motion compensation prediction module 106 comprises a prediction reference region production sub-module 108, an adaptive FP production sub-module 110, a motion vector generation sub-module 112, a predicted image production sub-module 114, and a prediction error decision sub-module 116. Furthermore, the prediction reference region production sub-module 108 comprises a 1/2 pixel interpolation region production sub-module 118 and a 1/4 pixel interpolation region production sub-module 120. The functions that are realized in a computer by the prediction reference region production sub-module 108, adaptive production sub-module 110, motion vector generation sub-module 112, predicted image production sub-module 114, prediction error decision sub-module 116, 1/2 pixel interpolation region production sub-module 118 and 1/4 pixel interpolation region production sub-module 120 are respectively the same as the prediction reference production unit 90, adaptive FP production unit 92, motion vector generation unit 96, predicted image production unit 98, prediction error decision unit 100, 1/2 pixel interpolation region production unit 102 and 1/4 pixel interpolation region production unit 104.

In the case of processing that thus produces the prediction reference image for a predetermined region in the reference frame for which block matching is to be performed, the memory capacity required at one time is reduced compared to processing that produces the prediction reference image for the reference frames as a whole.

Second Embodiment

Next, a video encoding apparatus 130 of a second embodiment of the present invention will be described. The video encoding apparatus 130 differs from the video encoding apparatus 1 of the first embodiment in that the numbers of non-zero DCT coefficients in the blocks surrounding the processing target block are used to express the degree of complexity of the movement of the processing target block from the reference frame. Since the DCT coefficients are coefficients into which the prediction residual difference image is decomposed, the number of non-zero DCT coefficients increases with an increase in the difference between the processing target block and the predicted image, i. e., with an increase in the degree of complexity of the movement of the processing target block from the reference frame.

Figure 12:
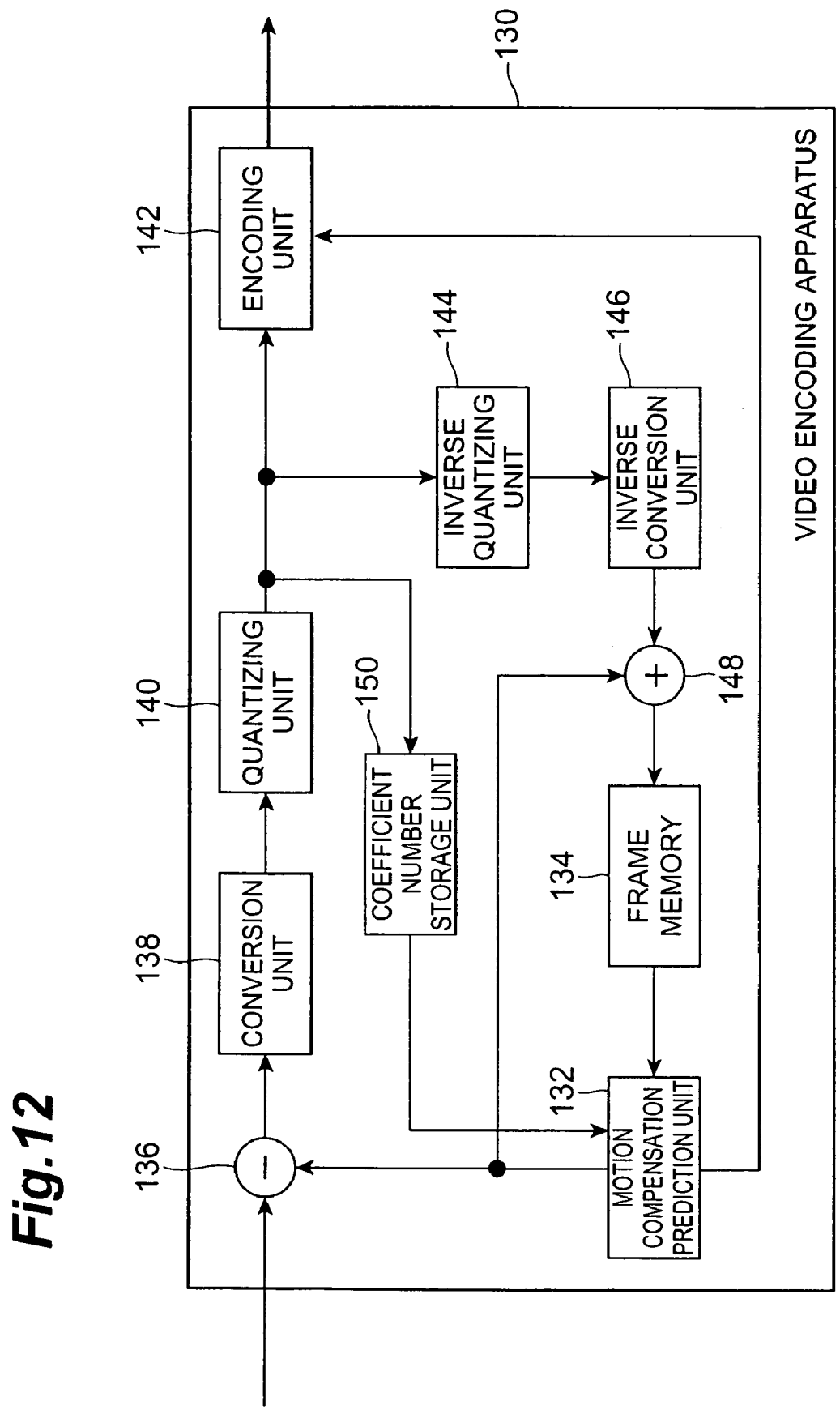
FIG. 12 is a block diagram which shows the functional configuration of a video encoding apparatus of a second embodiment.

In physical terms, the video encoding apparatus 130 has a configuration similar to that of the video encoding apparatus 1 of the first embodiment. FIG. 12 is a block diagram which shows the functional configuration of a video encoding apparatus of a second embodiment. In functional terms, as is shown in FIG. 12, the video encoding apparatus 130 comprises a motion compensation prediction unit 132, a frame memory 134, a subtraction unit 136, a conversion unit 138, a quantizing unit 140, an encoding unit 142, an inverse quantizing unit 144, an inverse conversion unit 146, an addition unit 148 and a coefficient number storage unit 150. Among these constituent elements, the motion compensation prediction unit 132, conversion unit 138 and coefficient number storage unit 150 are units with functions that differ from those in the video encoding apparatus 1. The motion compensation prediction unit 132, conversion unit 138 and coefficient number storage unit 150 will be described below, and a description of the other units will be omitted.

The conversion unit 138 divides the prediction residual difference image output from the subtraction unit 136 into a plurality of blocks of a predetermined size, and performs a DCT on the prediction residual difference image in each of the plurality of blocks. The DCT coefficients are quantized by the quantizing unit 140 and are thus converted into quantized DCT coefficients, and the number of non-zero quantized DCT coefficients is recorded in the coefficient number storage unit for each block. These numbers of non-zero DCT coefficients stored in the coefficient number storage unit 150 are used by the motion compensation prediction unit 132.

The motion compensation prediction unit 132 has a configuration similar to that of the motion compensation prediction unit 2 of the first embodiment shown in FIG. 2, but uses the numbers of non-zero quantized DCT coefficients in the blocks surrounding the processing target block instead of using the absolute values of the MVDs in the blocks surrounding the processing target block when the reference region selector 36 determines the degree of complexity of the movement in the processing target block in the first embodiment. Furthermore, since the remaining processing of the motion compensation prediction unit 132 is similar to that of the motion compensation prediction unit 2, a description of this processing is omitted.

The operation of the video encoding apparatus 130 and the video encoding method performed by the video encoding apparatus 130 also differ from the first embodiment only in that the numbers of non-zero quantized DCT coefficients in the blocks surrounding the processing target block are used to express the degree of complexity of the movement of the processing target block from the reference frame. Accordingly, a description of this operation and method are omitted. Furthermore, the video encoding program that is used to cause a computer to operate as the video encoding apparatus 130 similarly differs from the video encoding program 50 of the first embodiment only in that the numbers of non-zero quantized DCT coefficients in the surrounding blocks are used to express the degree of complexity of the movement of the processing target block from the reference frame. Accordingly, a description of this program is omitted.

Furthermore, in the video encoding apparatus 130 as in the video encoding apparatus 1 of the first embodiment, the prediction reference image may be produced for the reference frame as a whole when motion compensation prediction is performed, or the prediction reference image may be produced only for a predetermined region in the reference frame for which block matching is to be performed in accordance with the position of the processing target block.

As explained above, the concept of the present invention can also be realized by using the numbers of non-zero quantized DCT coefficients in the blocks surrounding the processing target block as the degree of complexity of the movement of the processing target block from the reference frames as described above.

Third Embodiment

Next, a video encoding apparatus 160 of a third embodiment of the present invention will be described. The video encoding apparatus 160 differs from the video encoding apparatus 1 of the first embodiment in that the absolute value of the MVD in the processing target block are used to express the degree of complexity of the movement of the processing target block from the reference frame.

Figure 13:
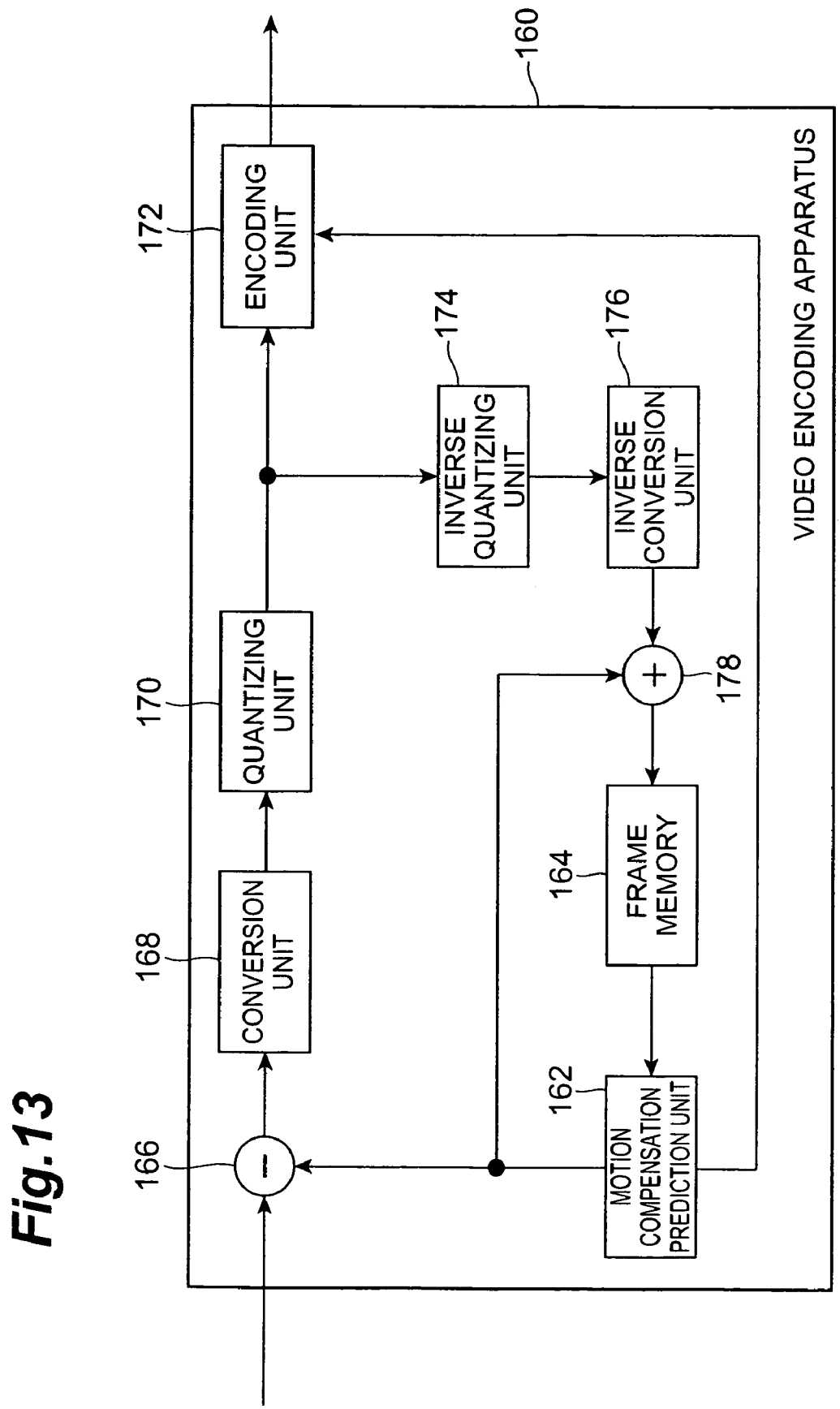
FIG. 13 is a block diagram which shows the functional configuration of a video encoding apparatus constituting a third embodiment.

In physical terms, the video encoding apparatus 160 has a configuration similar to that of the video encoding apparatus 1 of the first embodiment. FIG. 13 is a block diagram which shows the functional configuration of a video encoding apparatus constituting a third embodiment. In functional terms, as is shown FIG. 13, the video encoding apparatus 160 comprises a motion compensation prediction unit 162, a frame memory 164, a subtraction unit 166, a conversion unit 168, a quantizing unit 170, an encoding unit 172, an inverse quantizing unit 174, an inverse conversion unit 176, and an addition unit 178. Among these constituent elements, in the video encoding apparatus 160, the motion compensation prediction unit 162 performs processing that differs from that of the constituent elements provided in the video encoding apparatus 1. Accordingly, the motion compensation prediction unit 162 will be described below, and a description relating to the other constituent elements will be omitted.

Figure 14:
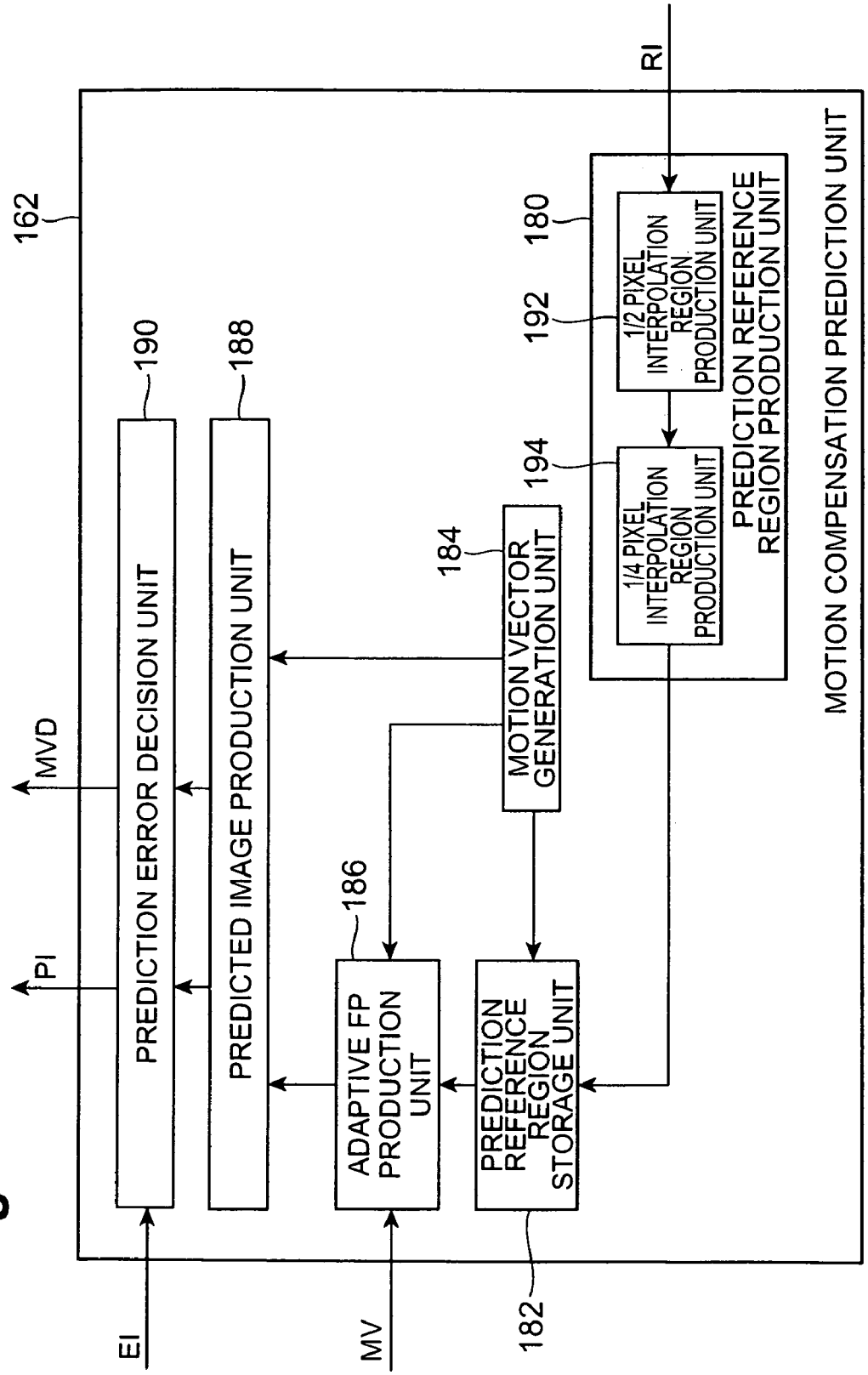
FIG. 14 is a block diagram which shows the configuration of the motion compensation prediction unit of the video encoding apparatus of the third embodiment.

FIG. 14 is a block diagram which shows the configuration of the motion compensation prediction unit of the video encoding apparatus of the third embodiment. As is shown in FIG. 14, the motion compensation prediction unit 162 comprises a prediction reference region production unit 180, a prediction reference region storage unit 182, a motion vector generation unit 184, and adaptive FP production unit 186, a predicted image production unit 188, and a prediction error decision unit 190.

The prediction reference region production unit 180 comprises a 1/2 pixel interpolation region production unit 192 and a 1/4 pixel interpolation region production unit 194. The prediction reference region production unit 180 produces a prediction reference image in which an image of predetermined region of the reference frame corresponding to the processing target block are converted into an image with a quadrupled resolution by the same processing as that of the prediction reference region production unit 90 of the first embodiment. The prediction reference region production unit 180 stores the prediction reference image in the prediction reference region storage unit 182.

The motion vector generation unit 184 produces motion vectors to the positions in the prediction reference image in which block matching is to be performed for the processing target block, and outputs these motion vectors to the adaptive FP production unit 186 and predicted image production unit 188.

The adaptive FP production unit 186 produces MVD by calculating a difference between median value of the motion vectors in the blocks surrounding the processing target block and a motion vector output by the motion vector generation unit 184. In cases where the absolute value of the MVD is smaller than a predetermined value, the adaptive FP production unit 186 converts the (3/4, 3/4) position pixels of the prediction reference image into the FPs. The processing that produces these FPs is similar to the processing performed by the first FP production unit 26 of the first embodiment. On the other hand, in cases where the absolute value of the MVD is equal to or greater than the predetermined value, FP are provided in the prediction reference image by processing similar to that of the second FP production unit of the first embodiment. The prediction reference image provided with FP by the adaptive FP production unit 186 is output to the predicted image production unit 188.

The predicted image production unit 188 takes the image of a region specified by the motion vector output by the motion vector generation unit 184 from the prediction reference image output by the adaptive FP production unit 186 as a predicted image candidate, and establishes a correspondence between the predicted image candidate and the motion vector. The motion vector generation unit 184 produces a plurality of motion vectors so that block matching is performed for the entire region of the prediction reference image, and the predicted image candidates for the plurality of motion vectors are produced by the predicted image production unit 188.

The prediction error decision unit 190 selects the candidate that show the least error with respect to the processing target block, among the plurality of predicted image candidates produced by the predicted image production unit 188, as a predicted image. The prediction error decision unit 190 extracts the motion vector associated with the selected candidate as the motion vector of the processing target block. Predicted images are determined for all of the blocks of the coding target frame, and are output to the subtraction unit 166. Motion vectors are also determined for all of the blocks of the coding target frame. These motion vectors are converted into MVDs, and the MVDs are then output to the encoding unit 172 by the prediction error decision unit 190.

Figure 15:
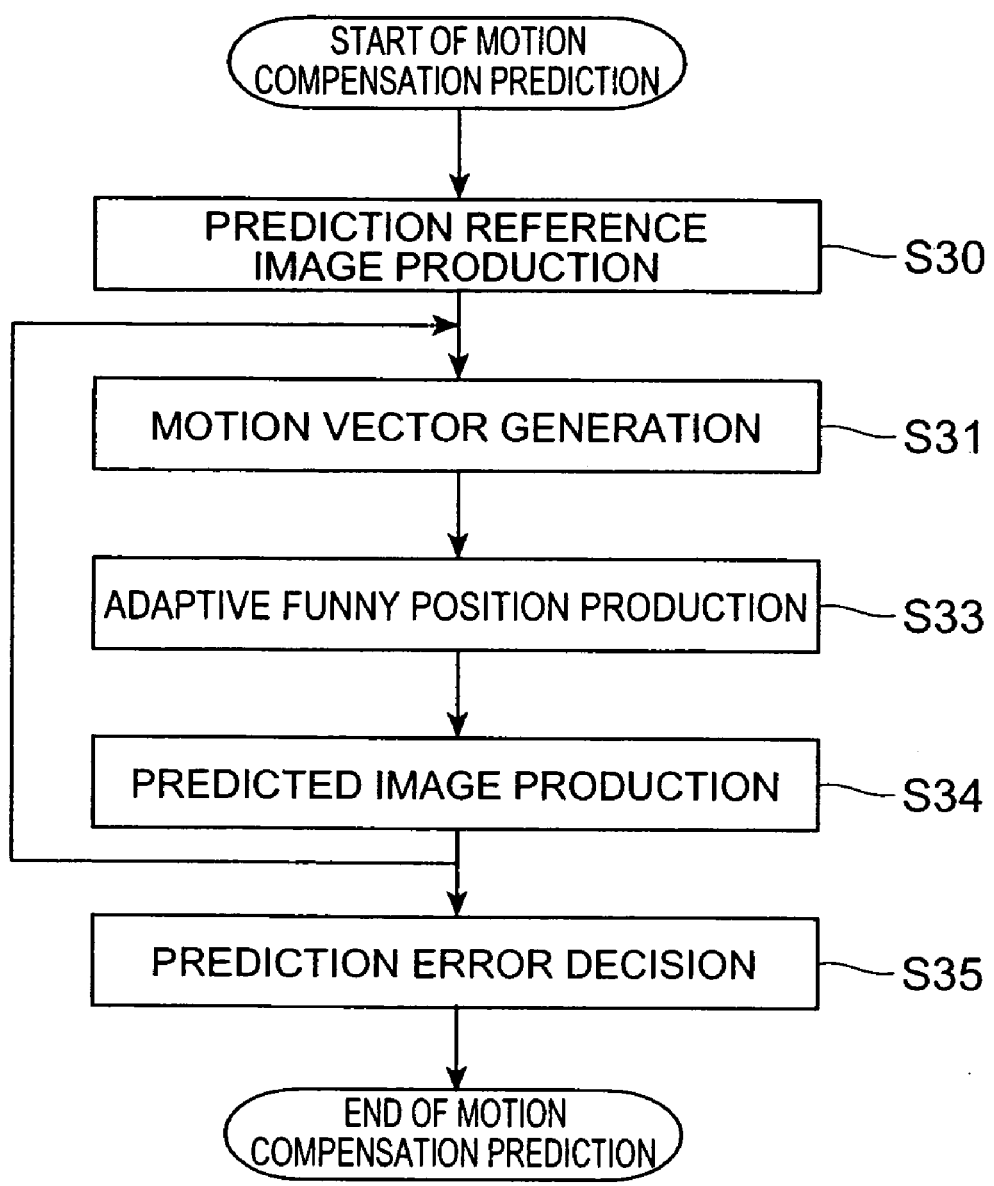
FIG. 15 is a flow chart which shows the processing of the motion compensation prediction in the third embodiment.

Next, the operation of the video encoding apparatus 160 and the video encoding method of the third embodiment will be described. Here, only the processing relating to the motion compensation prediction that differs from the video encoding method of the first embodiment will be described. FIG. 15 is a flow chart which shows the processing of the motion compensation prediction in the third embodiment.

In the motion compensation prediction of the third embodiment, as shown in FIG. 15, an image of a region which is predetermined in accordance with the processing target block, among the reference frame, is first converted into an image with a quadrupled resolution by the prediction reference region production unit 180, and the image with a quadrupled resolution are stored as a prediction reference image in the prediction reference region storage unit 182 (step S30).

Next, a motion vector to a position of the prediction reference image in which block matching is to be performed are generated by the motion vector generation unit 184, and the motion vectors is output to the adaptive FP production unit 186 and predicted image production unit 188 (step S31).

Next, a differential motion vector (MVD) is produced by the adaptive FP production unit 186 on the basis of the motion vector output by the motion vector generation unit 184 and vectors formed by the median value of motion vectors of the blocks surrounding the processing target block. The adaptive FP production unit 186 varies the number of FP provided in the prediction reference image as described above on the basis of the result of a comparison of the absolute value of the MVD and a predetermined value (step S33).

The image of the block in positions corresponding to the motion vector output by the motion vector generation unit 184 is extracted by the predicted image production unit 188 from the prediction reference image output by the adaptive FP production unit 186, and the image is taken as a predicted image candidate, caused to correspond to the abovementioned motion vector and output to the prediction error decision unit 190 (step S34). The processing from step S31 to step S34 is repeated until block matching has been performed for all of the entire region of the prediction reference image, so that a plurality of predicted image candidates are produced.

The prediction error decision unit 190 selects the candidate that show the least error with respect to the processing target block, among the plurality of predicted image candidates, as a predicted image, and outputs the predicted image to the subtraction unit 166. Furthermore, the prediction error decision unit 190 extracts the motion vector that is associated with the predicted image. The prediction error decision unit 190 converts the motion vectors into MVD, and outputs the MVD to the encoding unit 172 (step S35).

The video encoding program that causes a computer to function as the video encoding apparatus 160 will be described below. Since this video encoding program differs from the video encoding program 50 of the first embodiment only in terms of the configuration of the motion compensation prediction module, only the configuration of the motion compensation prediction module 200 will be described here.

Figure 16:
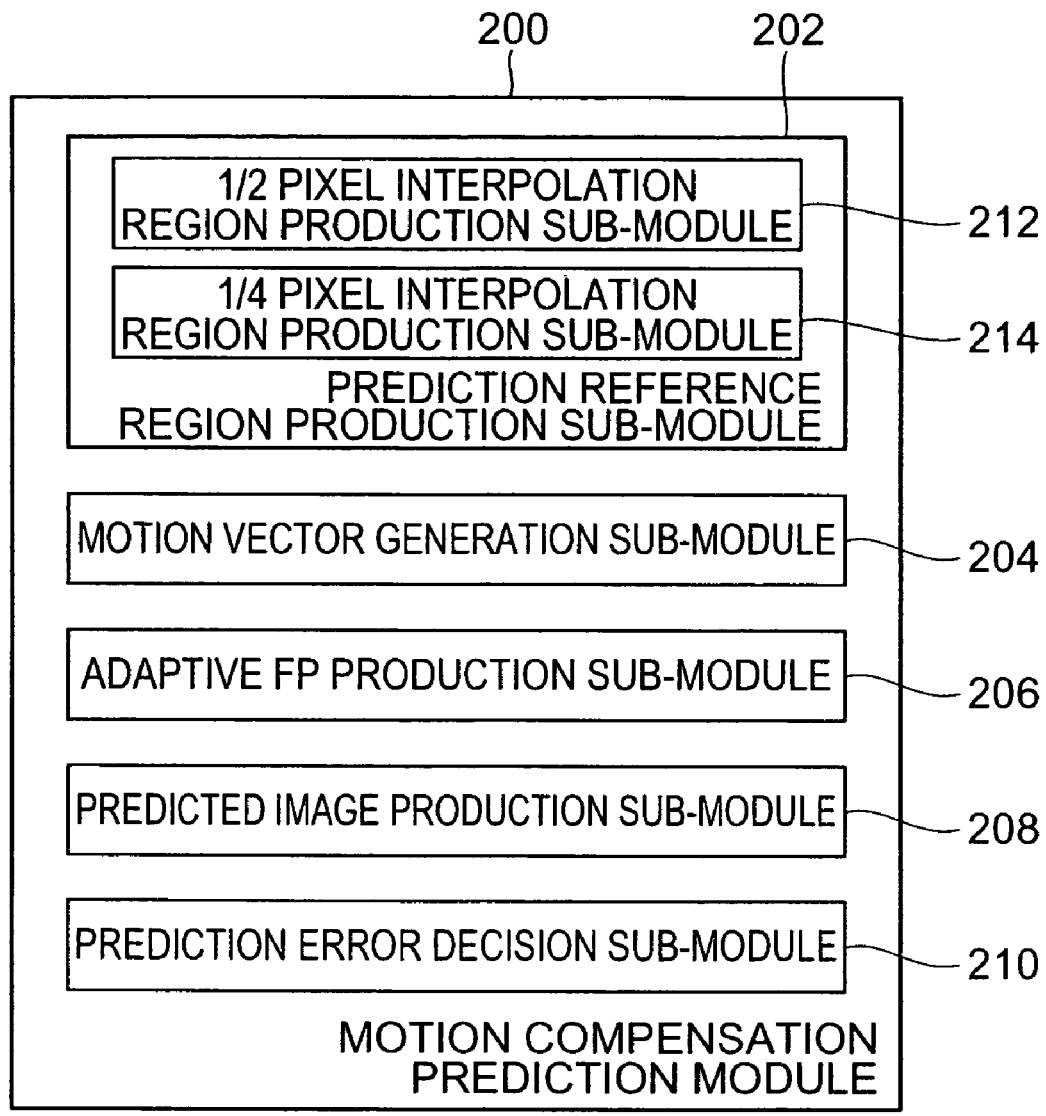
FIG. 16 is a diagram which shows the configuration of the motion compensation prediction module of a video encoding program relating to a third embodiment.

FIG. 16 is a diagram which shows the configuration of the motion compensation prediction module of a video encoding program relating to a third embodiment. The motion compensation prediction module 200 comprises a prediction reference region production sub-module 202, a motion vector generation sub-module 204, an adaptive production sub-module 206, a predicted image production sub-module 208, and a prediction error decision sub-module 210. The prediction reference region production sub-module 202 comprises a 1/2 pixel interpolation region production sub-module 212 and a 1/4 pixel interpolation region production sub-module 214. The functions that are realized in a computer by the prediction reference region production sub-module 202, motion vector generation sub-module 204, adaptive production sub-module 206, predicted image production sub-module 208, prediction error decision sub-module 210, 1/2 pixel interpolation region production sub-module 212 and 1/4 pixel interpolation region production sub-module 214 are respectively the same as the prediction reference region production unit 180, motion vector generation unit 184, adaptive FP production unit 186, predicted image production unit 188, prediction error decision unit 190, 1/2 pixel interpolation region production unit 192 and 1/4 pixel interpolation region production unit 194.

As explained above, the concept of the present invention can also be realized by means of a video encoding apparatus with a configuration that uses the MVD of the processing target block themselves for expressing the degree of complexity of the movement of the processing target block.

Fourth Embodiment

Next, a video decoding apparatus 220 of a fourth embodiment of the present invention will be described. The video decoding apparatus 220 is an apparatus that produces video by decoding compressed data produced by the video encoding apparatus 1 of the first embodiment. In physical terms, the video decoding apparatus 220 is a computer comprising a CPU (central processing unit), a memory apparatus called a memory, a storage apparatus called a hard disk and the like. Here, in addition to ordinary computers such as personal computers or the like, the term "computer" also includes portable information terminals such as mobile communications terminals, so that the concept of the present invention can be widely applied to apparatus that are capable of information processing.

Figure 17:
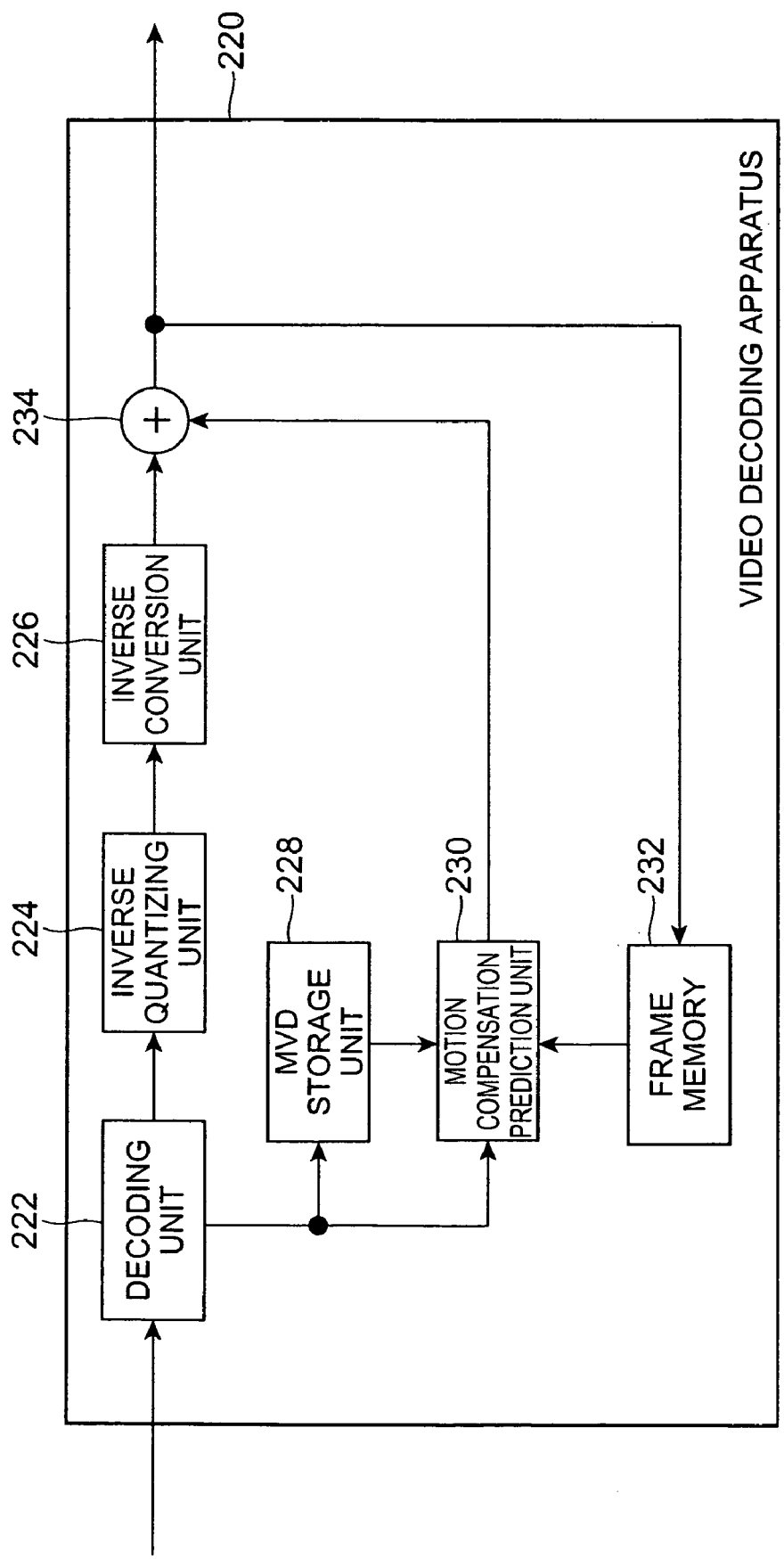
FIG. 17 is a block diagram which shows the functional configuration of a video decoding apparatus relating to a fourth embodiment.

The functional configuration of the video decoding apparatus 220 will be described below. FIG. 17 is a block diagram which shows the functional configuration of a video decoding apparatus relating to a fourth embodiment. In functional terms, the video decoding apparatus 220 comprises a decoding unit 222, an inverse quantizing unit 224, an inverse conversion unit 226, an MVD storage unit 228, a motion compensation prediction unit 230, a frame memory 232 and an addition unit 234.

The decoding unit 222 is a unit that decodes compressed data produced by the video encoding apparatus 1. The decoding unit outputs the MVDs obtained by decoding the compressed data to the MVD storage unit 228 and the motion compensation prediction unit 230. Furthermore, the decoding unit 222 outputs the quantized coefficients decoded from the compressed data to the inverse quantizing unit 224.

The inverse quantizing unit 224 produces coefficients by performing an inverse quantizing operation on the quantized coefficients, and outputs these coefficients to the inverse conversion unit 226. Using the coefficients output by the inverse quantizing unit 224, the inverse conversion unit 226 produces a predicted residual difference image by performing an inverse conversion on the basis of a predetermined inverse conversion rule. The inverse conversion unit 226 outputs the predicted residual image to the addition unit 234. Here, in cases where the DCT is used by the conversion unit 8 of the video encoding apparatus 1, the inverse DCT can be used as the specified inverse conversion rule. Furthermore, in cases where the MP method is used by the conversion unit 8 of the video encoding apparatus 1, the inverse operation of the MP method can be used as the predetermined inverse conversion rule.

The MVD storage unit 228 stores the MVDs that are output by the decoding unit 222. The MVDs stored by the MVD storage unit are utilized by the motion compensation prediction unit 230.

Using the MVDs output by the decoding unit 222, the motion compensation prediction unit 230 produces a predicted image of the decoding target frame from the reference frame stored in the frame memory 232. The details of this processing will be described later. The motion compensation prediction unit 230 outputs the predicted image that is produced to the addition unit 234.

The addition unit 234 adds the predicted image output by the motion compensation prediction unit 230 and the predicted residual difference image output by the inverse conversion unit 226, and thus produces the decoding target frame. The addition unit 234 outputs the frame to the frame memory 232, and the frame that is output to the frame memory 232 is utilized by the motion compensation prediction unit 230 as a reference frame.

Figure 18:
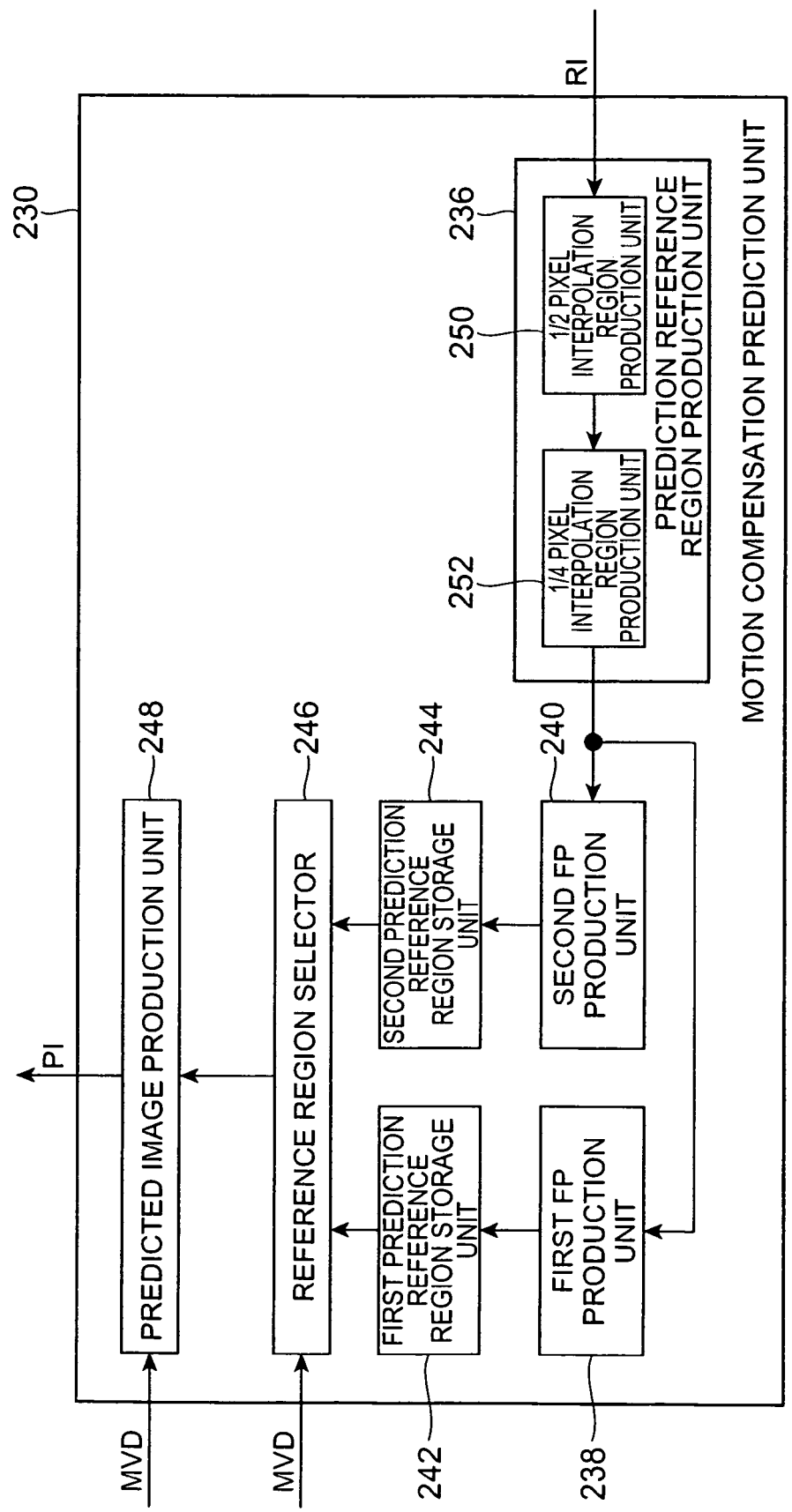
FIG. 18 is a block diagram which shows the configuration of the motion compensation prediction unit of the video decoding apparatus of the fourth embodiment.

Next, the details of the motion compensation prediction unit 230 will be described. FIG. 18 is a block diagram which shows the configuration of the motion compensation prediction unit of the video decoding apparatus of the fourth embodiment. The motion compensation prediction unit 230 comprises a prediction reference region production unit 236, a first FP production unit 238, a second FP production unit 240, a first prediction reference region storage unit 242, a second prediction reference region storage unit 244, a reference region selector 246 and a predicted image production unit 248.

The prediction reference region production unit 236 produces a prediction reference image on the basis of the reference frame RI stored in the frame memory 232. The prediction reference region production unit 24 has a 1/2 pixel interpolation region production unit 250 and a 1/4 pixel interpolation region production unit 252. The 1/2 pixel interpolation region production unit 250 and 1/4 pixel interpolation region production unit 252 respectively perform the same processing as the 1/2 pixel interpolation region production unit 42 and 1/4 pixel interpolation region production unit 44 of the video encoding apparatus 1.

The first FP production unit 238 performs the same processing as the first FP production unit 26 of the video encoding apparatus 1; this unit produces a first prediction reference image, and stores the image in the first prediction reference region storage unit 242. The second FP production unit 240 performs the same processing as the second FP production unit 28 of the video encoding apparatus 1; this unit produces a second prediction reference image, and stores the image in the second prediction reference region storage unit 244.

The reference region selector 246 performs the same processing as the reference region selector 36 of the video encoding apparatus 1; this selector acquires MVDs in the blocks surrounding the processing target block from the MVD storage unit 228, compares the absolute values of the acquired MVDs with a predetermined value, and outputs the decision that selects either the first prediction reference image or the second prediction reference image on the basis of the result of the comparison The predicted image production unit 248 calculates the motion vector of the processing target block from the MVD output by the decoding unit 222. Furthermore, the predicted image production unit 248 selects either the first prediction reference image or the second prediction reference images on the basis of the decision produced by the reference region selector 246, and extracts an image of a region specified by the motion vector of the processing target block, among the selected image, as a predicted image of the processing target block.

Figure 19:
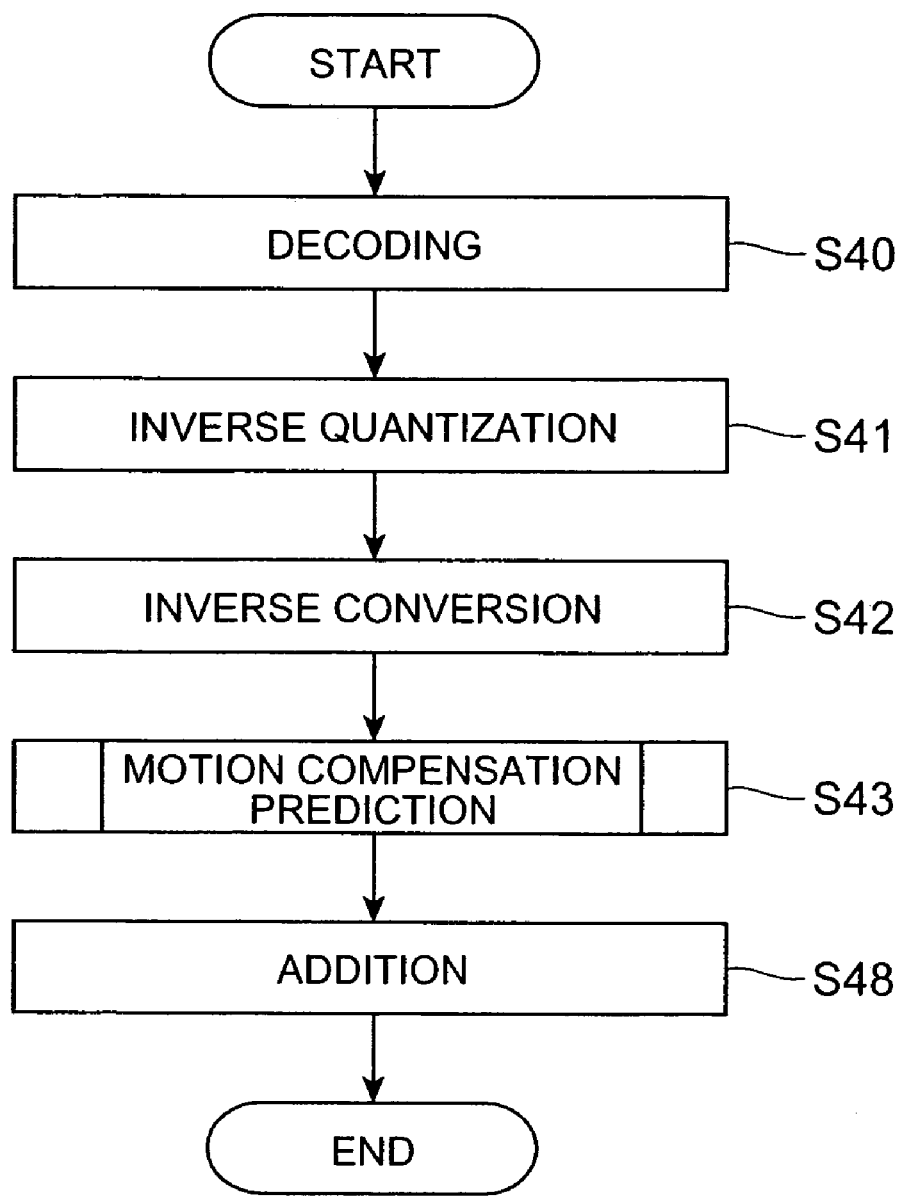
FIG. 19 is a flow chart of a video decoding method relating to a fourth embodiment.

The operation of the video decoding apparatus 220 will be described below, and the video decoding method of the fourth embodiment will also be described. FIG. 19 is a flow chart of a video decoding method relating to a fourth embodiment. Furthermore, FIG. 20 is a flow chart showing processing relating to the motion compensation prediction of the video decoding method of the fourth embodiment.

In the video decoding method of the fourth embodiment, as shown in FIG. 19, the MVDs and quantized coefficients for each of the plurality of blocks of the decoding target frame are first decoded by the decoding unit 222 from the compressed data produced by the video encoding apparatus 1 (step S40). The quantized coefficients are converted into coefficients produced by the performance of an inverse quantizing operation by the inverse quantizing unit 224 (step S41). These coefficients are used for the inverse conversion performed by the inverse conversion unit 226, and as a result of this inverse conversion, the predicted residual difference image is restored (step S42).

The MVDs decoded by the decoding unit 222 are stored by the MVD storage unit 208. Furthermore, the MVDs decoded by the decoding unit 222 are output to the motion compensation prediction unit 230, and motion compensation prediction is performed by the motion compensation prediction unit 230 using these MVDs (step S43).

Figure 20:
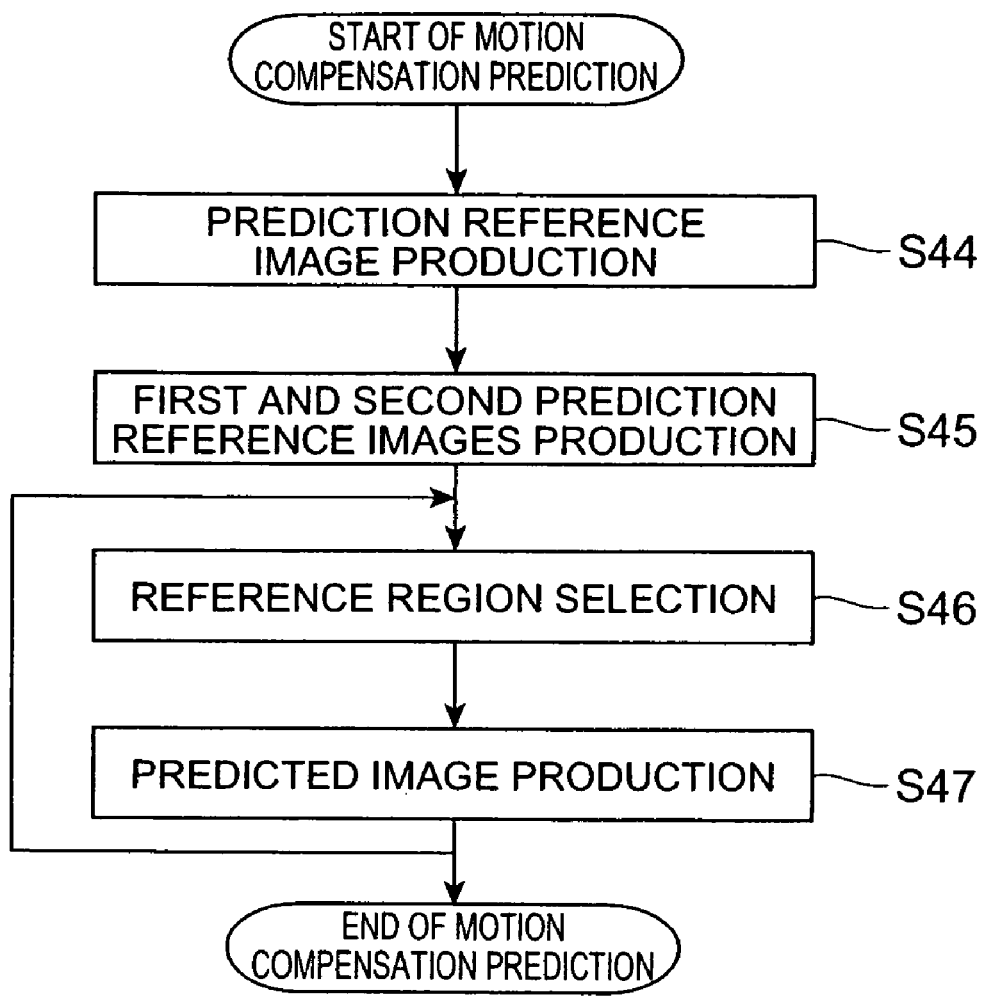
FIG. 20 is a flow chart showing processing relating to the motion compensation prediction of the video decoding method of the fourth embodiment.

In the motion compensation prediction unit 230, as shown in FIG. 20, a prediction reference image which is formed as an image in which the resolution of the reference frame is quadrupled is produced by the prediction reference region production unit 236 (step S44). The prediction reference image is output to the first FP production unit and second FP production unit 240. The prediction reference image is converted into a first prediction reference image by the first FP production unit 238, or is converted into a second prediction reference image by the second FP production unit 240 (step S45).

Next, the degree of complexity of the movement of the processing target block is determined by the reference region selector 246 using the MVDs in the blocks surrounding the processing target block. This degree of complexity is compared with a predetermined value by the reference region selector 246, and a decision that selects either the first prediction reference image or the second prediction reference image is made on the basis of the results of the comparison (step S46). Furthermore, a motion vector of the processing target block is generated on the basis of the MVD by the predicted image production unit 248. Moreover, an image of a region specified by the motion vector of the processing target block is extracted by the predicted image production unit 248 from the image selected by the reference region selector 246, among the first prediction reference images and second prediction reference images (step S47). The image extracted by the predicted image production unit 248 is taken as the predicted image of the processing target block.

The processing of steps S52 and S53 is performed for all of the blocks of the decoding target frame, so that the predicted images of the decoding target frame are produced. Returning to FIG. 19, the predicted images of the decoding target frame and the predicted residual difference image are added by the adding unit 234, so that the decoding target frame is restored (step S48).

Figure 21:
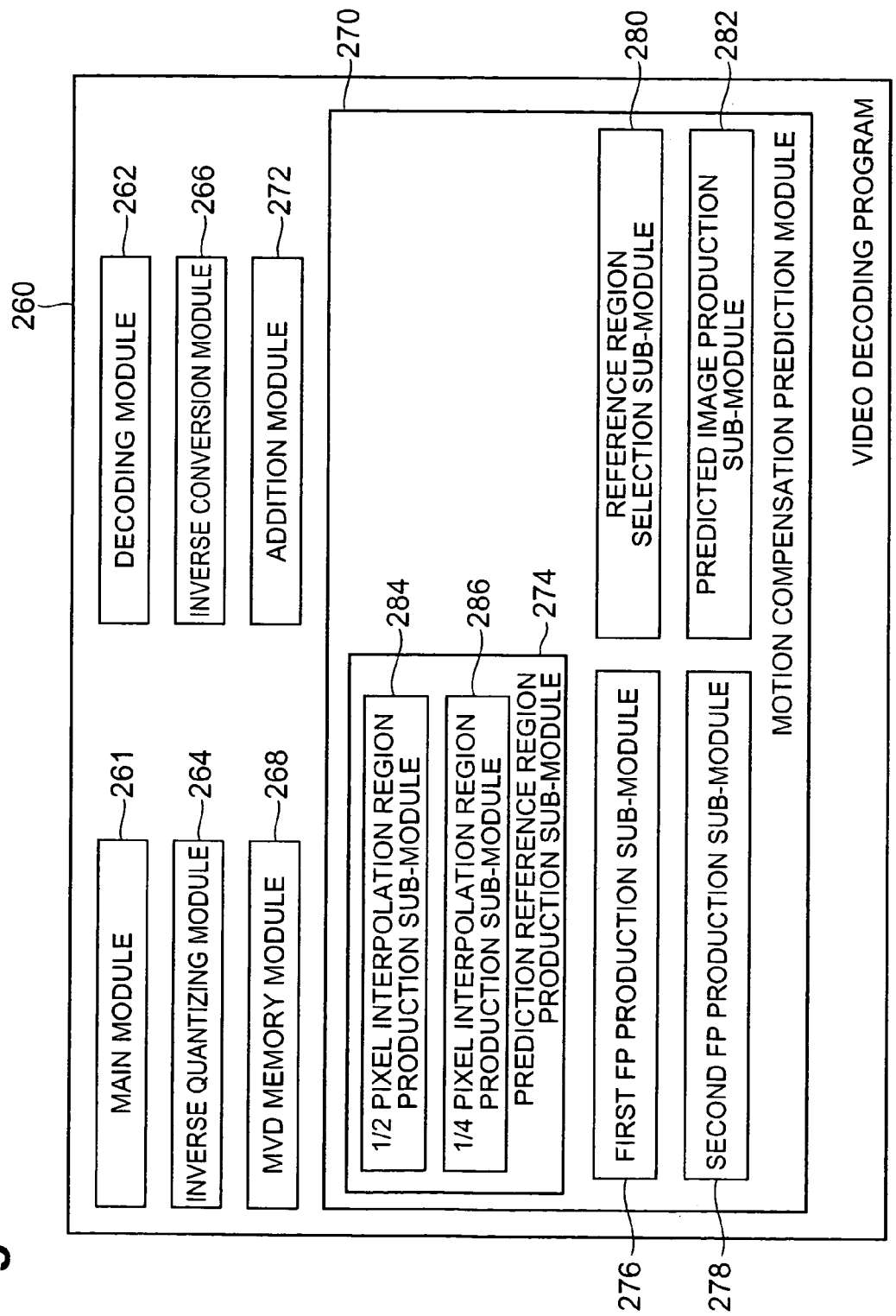
FIG. 21 is a diagram which shows the configuration of a video decoding program relating to a fourth embodiment.

The video decoding program that causes a computer to operate as the video decoding apparatus 220 will be described below. FIG. 21 is a diagram which shows the configuration of a video decoding program relating to a fourth embodiment. The video decoding program comprises 260 a main module 261 that controls the processing, a decoding module 262, an inverse quantizing module 264, an inverse conversion module 266, an MVD memory module 268, a motion compensation prediction module 270, and an addition module 272. The motion compensation prediction module 270 comprises a prediction reference region production sub-module 274, a first FP production sub-module 276, a second FP production sub-module 278, a reference region selection sub-module 280 and a predicted image production sub-module 282. The prediction reference region production sub-module 274 comprises a 1/2 pixel interpolation region production sub-module 284 and a 1/4 pixel interpolation region production sub-module 286.

The functions that are realized in a computer by the decoding module 262, inverse quantizing module 264, inverse conversion module 266, MVD storage module 268, motion compensation prediction module 270, addition module 272, prediction reference region production sub-module 274, first FP production sub-module 276, second FP production sub-module 278, reference region selection sub-module 280, predicted image production module 282, 1/2 pixel interpolation region production sub-module 284 and 1/4 pixel interpolation region production sub-module 286 are respectively the same as the decoding unit 222, inverse quantizing unit 224, inverse conversion unit 226, MVD storage unit 228, motion compensation prediction unit 230, addition unit 234, prediction reference region production unit 236, first FP production unit 238, second FP production unit 240, reference region selector 246, predicted image production unit 248, 1/2 pixel interpolation region production unit 250 and 1/4 pixel interpolation region production unit 252. The video decoding program comprises 260 is provided, for example, by recording media such as CD-ROM, DVD, ROM, or by semiconductor memories. The video decoding program comprises 260 may be a program provided as computer data signals over a carrier wave through a network.

The action and effect of the video decoding apparatus 220 of the fourth embodiment will be described below. In the video decoding apparatus 220, the absolute values of MVDs in the blocks surrounding the processing target block are extracted. The absolute values of these MVD express the degree of complexity of the movement of the processing target block from the reference frame. In the video decoding apparatus 220, in cases where the absolute values of the MVDs in the areas surrounding the processing target block are smaller than a predetermined value, a predicted image is extracted from the first prediction reference image produced by the first FP production unit 238. Namely, the predicted image is produced by using the first prediction reference image, in which the number of FP is small. On the other hand, in cases where the absolute values of the MVDs in the areas surrounding the processing target block are equal to or greater than the predetermined value, the predicted image is extracted from the second prediction reference image produced by the second FP production unit 240. Namely, the predicted image is produced by using the second prediction reference image, in which the number of FP is large. Thus, the video decoding apparatus 220 can restore the video by faithfully performing the processing that is the inverse processing with respect to the processing of the video encoding apparatus 1.

Figure 22:
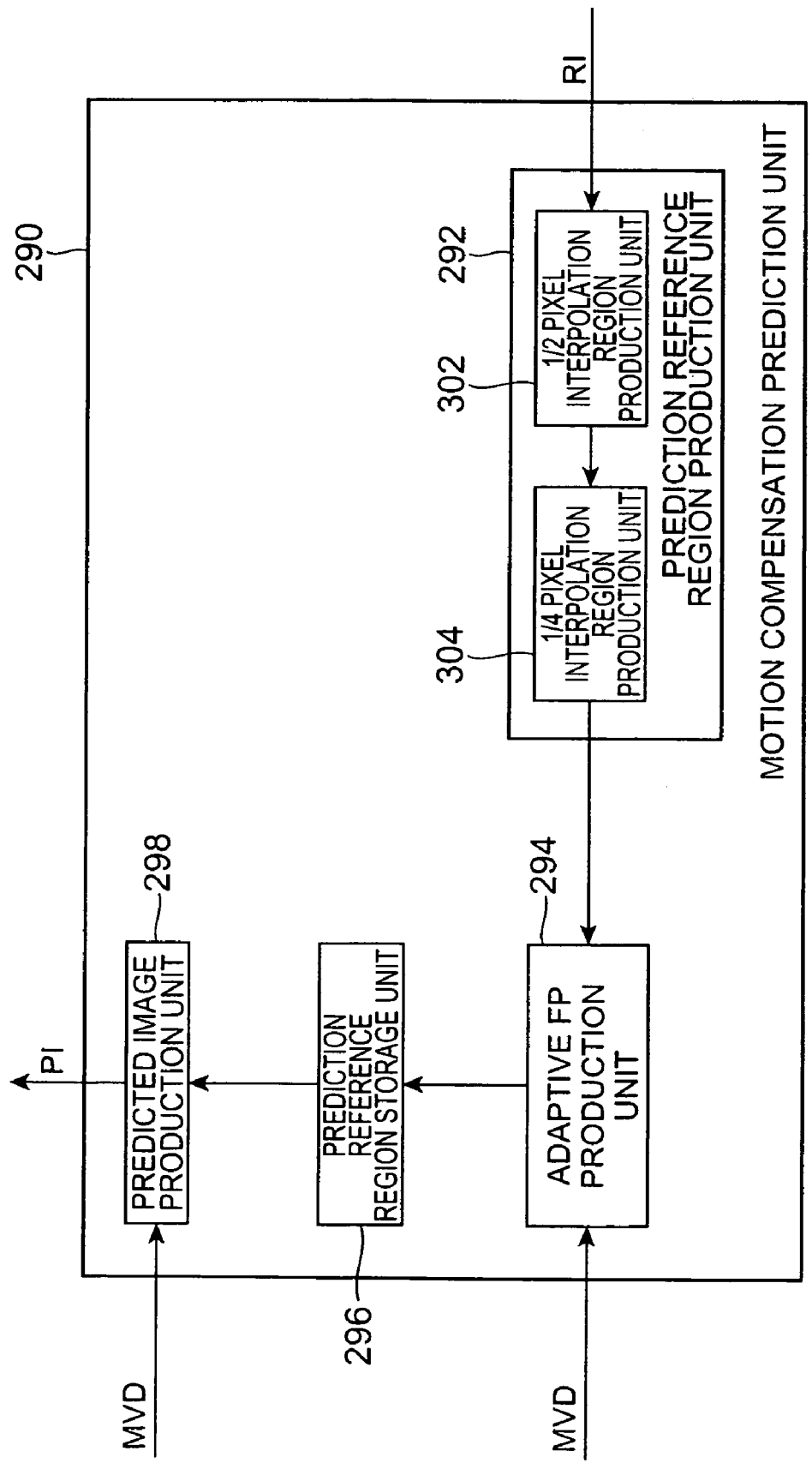
FIG. 22 is a block diagram which shows the configuration of an alternative motion compensation prediction unit in the video decoding apparatus of the fourth embodiment.

Note that, in the motion compensation prediction unit 230, the prediction reference image is produced for the reference frame as a whole when motion compensation prediction is performed. However, the motion compensation prediction unit 230 may also be constructed so that the prediction reference image is produced only for a predetermined region of the reference frame with respect to the processing target block, i.e., for the region that is required in order to extract the predicted image using the motion vector. In this case, the prediction reference image is produced each time that the processing target block is switched. FIG. 22 is a block diagram which shows the configuration of an alternative motion compensation prediction unit in the video decoding apparatus of the fourth embodiment. Such a motion compensation prediction unit 290 can be substituted for the motion compensation prediction unit 230 of the video decoding apparatus 220.

The motion compensation prediction unit 290 comprises a prediction reference region production unit 292, an adaptive FP production unit 294, a prediction reference region storage unit 296 and a predicted image production unit 298.

The prediction reference region production unit 292 produces a prediction reference image on the basis of a predetermined region of the reference frame corresponding to the processing target block. The prediction reference region production unit 292 comprises a 1/2 pixel interpolation region production unit 302 and a 1/4 pixel interpolation region production unit 304. The 1/2 pixel interpolation region production unit 302 converts an image of the abovementioned predetermined region into an image with a doubled resolution. Furthermore, the 1/4 pixel interpolation region production unit 304 produces a prediction reference image in which the image with a doubled resolution is further converted into an image with a quadrupled resolution. Such an increase in resolution can be realized by processing similar to that performed by the 1/2 pixel interpolation region production unit 42 and 1/4 pixel interpolation region production unit 44 of the video encoding apparatus 1.

The adaptive FP production unit 294 acquires MVDs in the blocks surrounding the processing target block from the MVD storage unit 208, and in cases where the absolute values of these MVDs are smaller than a predetermined value, the adaptive FP production unit 294 converts the (3/4, 3/4) pixel positions of the prediction reference image into FPs. The processing that produces these FPs is similar to the processing performed by the first FP production unit 238. On the other hand, in cases where the absolute values of the abovementioned MVDs are equal to or greater than the predetermined value, the adaptive FP production unit 294 provides FP to the prediction reference image by processing similar to that of the second FP production unit 240. The prediction reference image provided with FP by the adaptive FP production unit 294 is stored in the prediction reference region storage unit 296.

The predicted image production unit 298 generates a motion vector for the processing target block from the MVD decoded by the decoding unit 222. The predicted image production unit 298 extracts an image specified by the motion vector of the processing target block from the prediction reference image stored in the prediction reference region storage unit 94, and outputs the resulting image as a predicted image.

Figure 23:
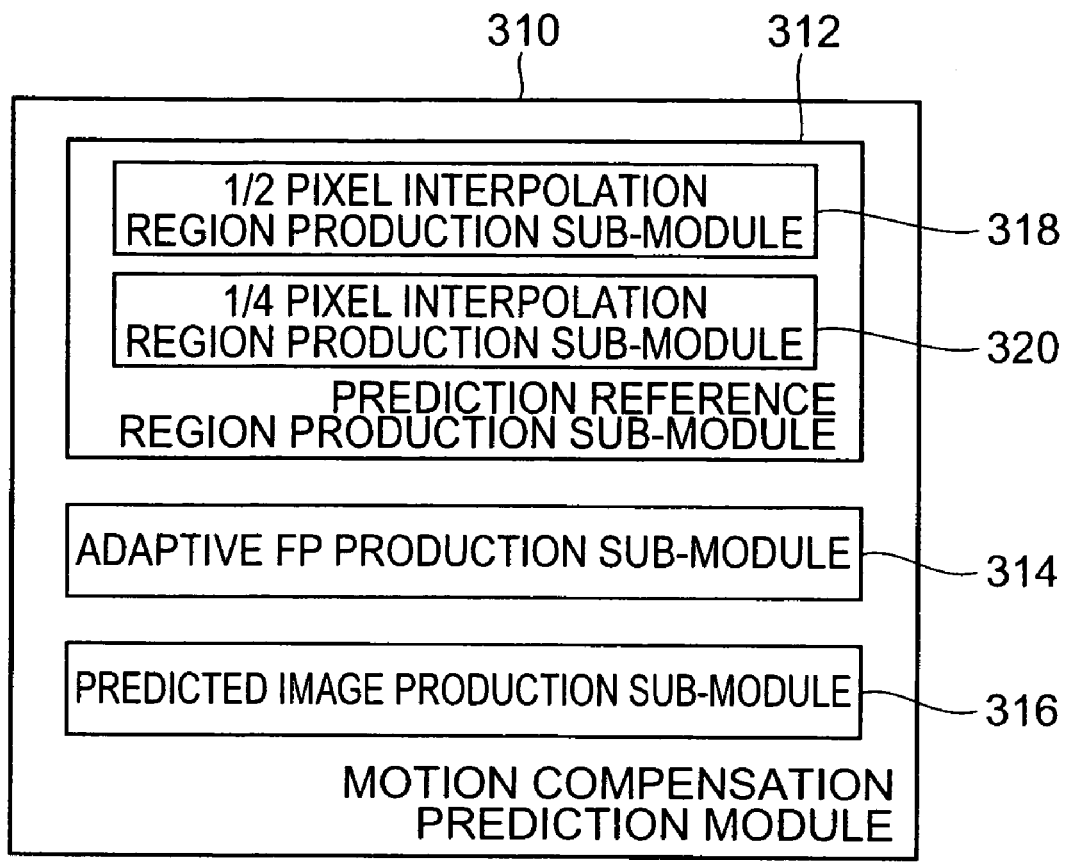
FIG. 23 is a diagram which shows the configuration of an alternative motion compensation prediction module in the video decoding program of the fourth embodiment.

Next, the motion compensation prediction module 310 that is used to cause a computer to operate in the same manner as the motion compensation prediction unit 290 will be described. The motion compensation prediction module 310 is used instead of the motion compensation prediction module 270 of the video decoding program 260. FIG. 23 is a diagram which shows the configuration of an alternative motion compensation prediction module in the video decoding program of the fourth embodiment.

The motion compensation prediction module comprises a prediction reference region production sub-module 312, an adaptive production sub-module 314, and a predicted image production sub-module 316. The prediction reference region production sub-module 312 comprises a 1/2 pixel interpolation region production sub-module 318 and a 1/4 pixel interpolation region production sub-module 320. The functions that are realized in a computer by the prediction reference region production sub-module 312, adaptive production sub-module 314, predicted image production sub-module 316, 1/2 pixel interpolation region production sub-module 318 and 1/4 pixel interpolation region production sub-module 320 are respectively the same as the prediction reference region production unit 292, adaptive FP production unit 294, predicted image production unit 298, 1/2 pixel interpolation region production unit 302 and 1/4 pixel interpolation region production unit 304.

In the case of the motion compensation prediction unit 290, the prediction reference image can be produced for only the region that is required in order to extract the predicted image for the processing target block; accordingly, the memory capacity that is required in order to produce the prediction reference image for the reference frame as a whole can be reduced.

Fifth Embodiment

A video decoding apparatus 330 constituting a fifth embodiment of the present invention will be described. The video decoding apparatus 330 is an apparatus that restores video from the compressed data produced by the video encoding apparatus 130 of the second embodiment. The video decoding apparatus 330 differs from the video decoding apparatus 220 of the fourth embodiment in that the numbers of quantized CDT coefficients in the blocks surrounding the processing target block are used to express the degree of complexity of the movement of the processing target block in the decoding target frame from the reference frame.

Figure 24:
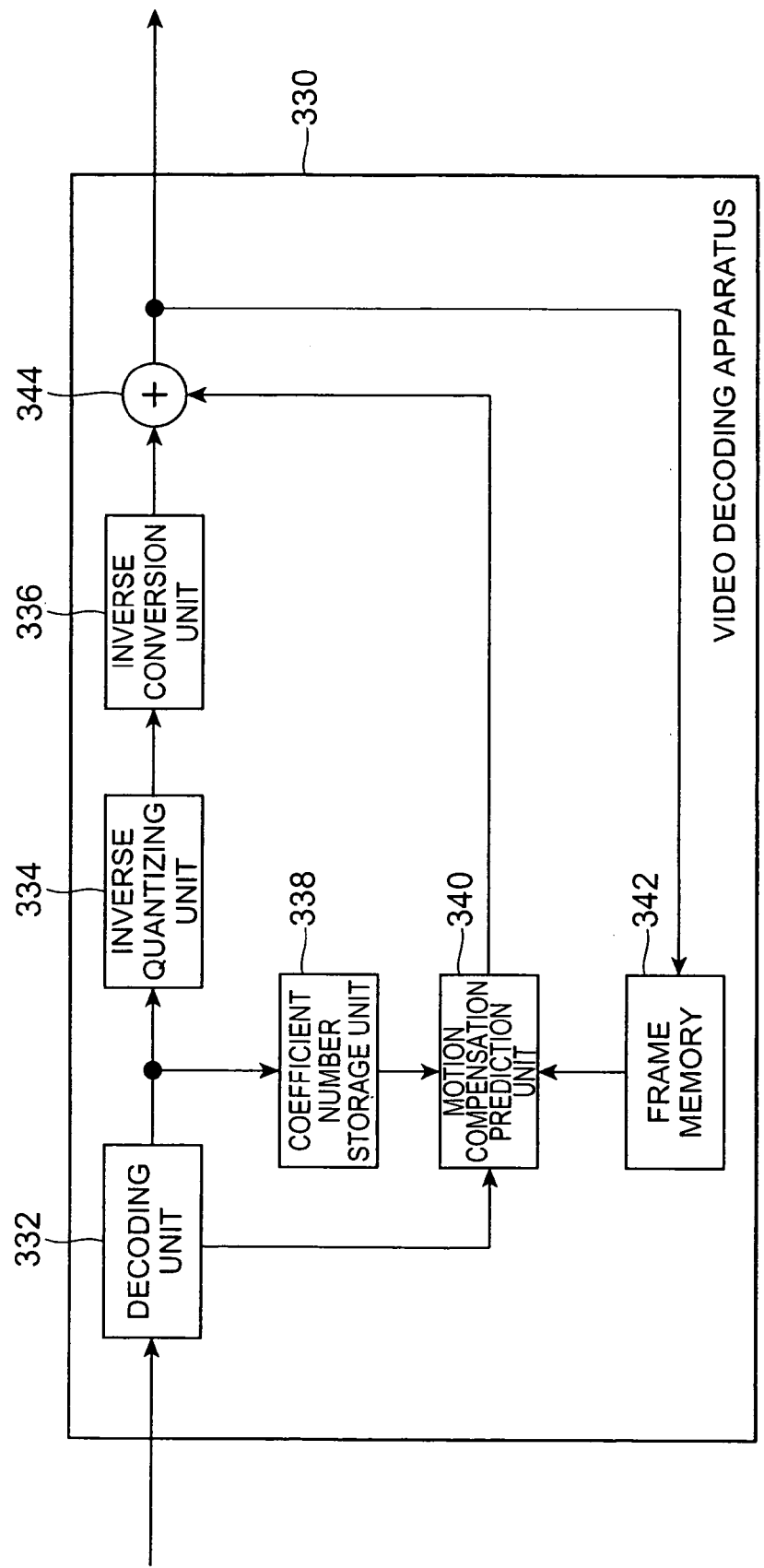
FIG. 24 is a block diagram which shows the functional configuration of a video decoding apparatus relating to a fifth embodiment.

In physical terms, the video decoding apparatus 330 has a configuration similar to that of the video decoding apparatus 220 of the fourth embodiment. FIG. 24 is a block diagram which shows the functional configuration of a video decoding apparatus relating to a fifth embodiment. In functional terms, the video decoding apparatus 330 comprises a decoding unit 332, an inverse quantizing unit 334, an inverse conversion unit 336, a coefficient number storage unit 338, a motion compensation prediction unit 340, a frame memory 342, and an addition unit 344. Among these constituent elements, the inverse conversion unit 336, coefficient number storage unit 338 and motion compensation prediction unit 340 are units with functions that differ from those of the video decoding apparatus 220; accordingly, the inverse conversion unit 336, coefficient number storage unit 338 and motion compensation prediction unit 340 will be described below, and a description of the other units will be omitted.

The inverse conversion unit 336 restores the predicted residual difference image by applying an inverse DCT to the DCT coefficients produced by the performance of an inverse quantizing operation by the inverse quantizing unit 334.

The coefficient number storage unit 338 stores the number of quantized DCT coefficients decoded by the decoding unit 332 for each block of the decoding target frame. The numbers of non-zero quantized DCT coefficients are utilized by the motion compensation prediction unit 340.

In the motion compensation prediction unit 340, the numbers of the non-zero quantized DCT coefficients in the blocks surrounding the processing target block are used by the reference region selector as the degree of complexity of movement relating to the processing target block. In other respects relating to the configuration of the motion compensation prediction unit 340, the configuration is the same as that of the motion compensation prediction unit 230 of the video decoding apparatus 220; accordingly, a description is omitted. The motion compensation prediction unit 340 produces a predicted image in which the numbers of FP are altered on the basis of this degree of complexity of movement.

Furthermore, the video decoding method of the fifth embodiment is the same as the video decoding method of the fourth embodiment, except for the fact that the numbers of non-zero quantized DCT coefficients in the blocks surrounding the processing target block are used as the degree of complexity of the movement of the processing target block; accordingly, a description is omitted. Furthermore, the video decoding program that is used to cause a computer to operate as the video decoding apparatus 330 can also be constructed by changing the motion compensation prediction module 270 of the video decoding program 260 to a module that causes the computer to realize the function of the motion compensation prediction unit 340.

Thus, the video decoding apparatus 330 of the fifth embodiment can restore the video by faithfully performing processing that is the inverse processing with respect to the processing of the video encoding apparatus 130.

Sixth Embodiment

A video decoding apparatus 350 of a sixth embodiment of the present invention will be described. The video decoding apparatus 350 is an apparatus that decodes video from the compressed data produced by the video encoding apparatus 160 of the third embodiment. The video decoding apparatus 350 differs from the video decoding apparatus 220 of the fourth embodiment in that the absolute value of the MVD in the processing target block is utilized in order to express the complexity of the movement of the processing target block in the decoding target frame from the reference frame.

Figure 25:
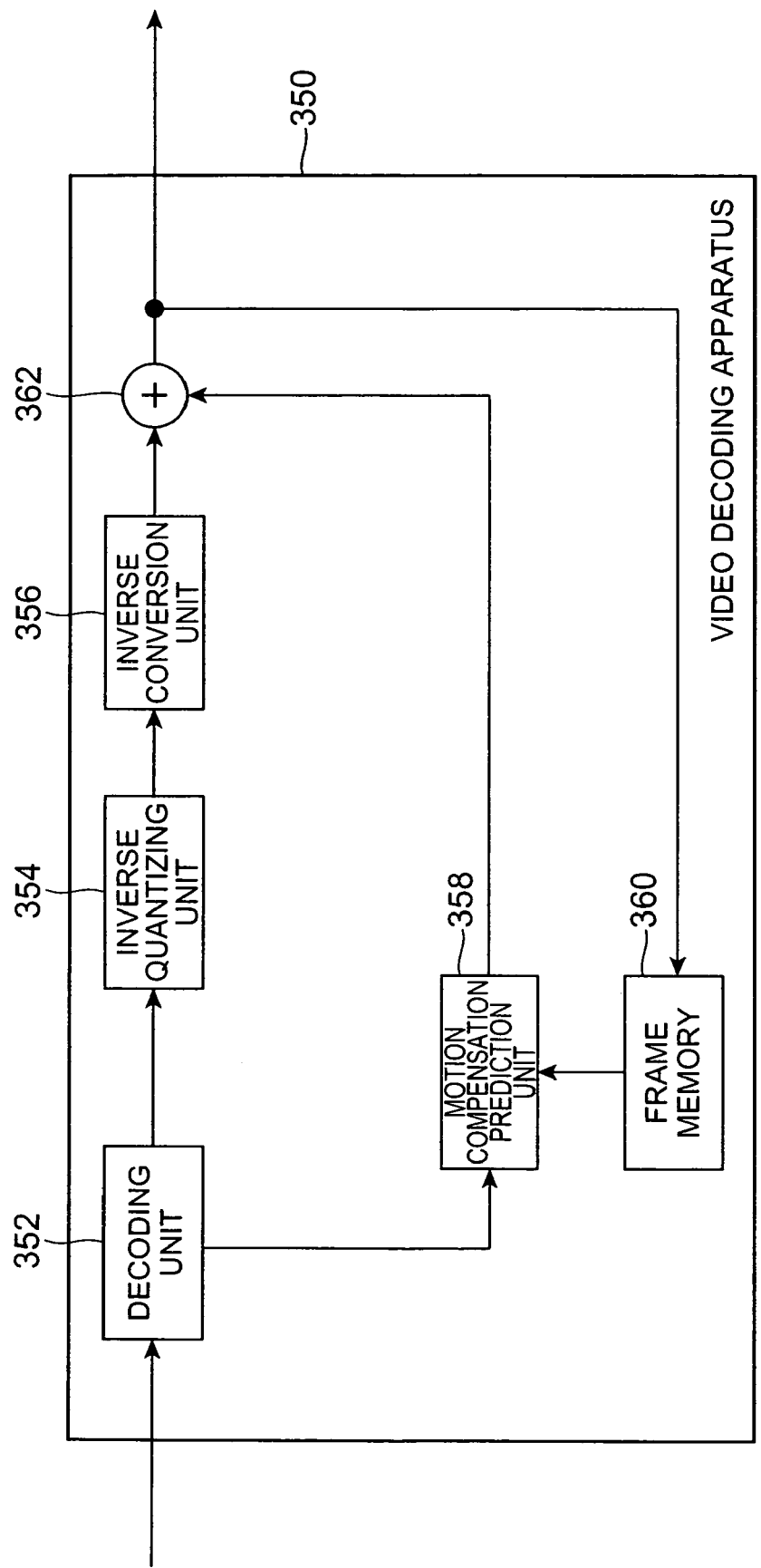
FIG. 25 is a block diagram which shows the functional configuration of a video decoding apparatus constituting a sixth embodiment.

In physical terms, the video decoding apparatus 350 has a configuration similar to that of the video decoding apparatus 220 of the fourth embodiment. FIG. 25 is a block diagram which shows the functional configuration of a video decoding apparatus constituting a sixth embodiment. In functional terms, as is shown in FIG. 25, the video decoding apparatus 350 comprises a decoding unit 352, an inverse quantizing unit 354, an inverse conversion unit 356, a motion compensation prediction unit 358, a frame memory 360 and an addition unit 362. In the video decoding apparatus 350, among these constituent elements, the motion compensation prediction unit 358 performs processing that differs from that of the constituent elements provided in the video decoding apparatus 220; accordingly, the motion compensation prediction unit 358 will be described below, and a description relating to the other constituent elements will be omitted.

Figure 26:
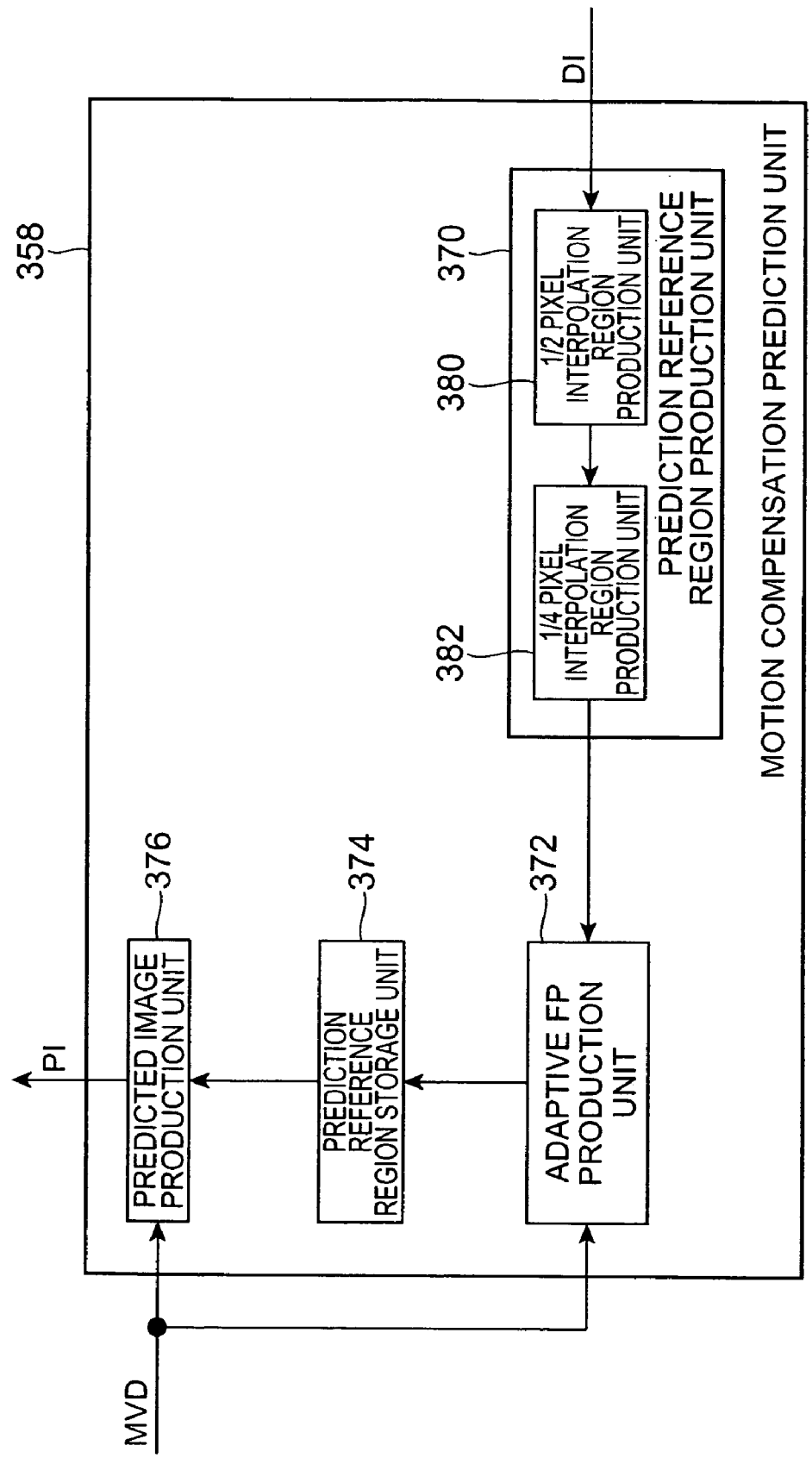
FIG. 26 is a block diagram which shows the configuration of the motion compensation prediction unit of the video decoding apparatus of the sixth embodiment.

FIG. 26 is a block diagram which shows the configuration of the motion compensation prediction unit of the video decoding apparatus of the sixth embodiment. As is shown in FIG. 26, the motion compensation prediction unit 358 comprises a prediction reference region production unit 370, an adaptive FP production unit 372, a prediction reference region storage unit 374, and a predicted image production unit 376. The prediction reference region production unit 370 comprises a 1/2 pixel interpolation region production unit 380 and a 1/4 pixel interpolation region production unit 382. The prediction reference region production unit 370 produces a prediction reference image in which an image of a predetermined region of the reference frame corresponding to the processing target block are converted into an image with a quadrupled resolution by processing similar to that of the prediction reference region production 292 in the fourth embodiment.

In cases where the absolute value of the MVD of the processing target block, which is decoded by the decoding unit 352, is smaller than a predetermined value, the adaptive FP production unit 372 converts the (3/4, 3/4) pixel positions of the prediction reference image as FPs. The processing that produces these FPs is similar to the processing performed by the first FP production unit 238 of the fourth embodiment. On the other hand, in cases where the absolute value of the abovementioned MVD is equal to or greater than the predetermined value, the adaptive FP production unit 372 provides FPs to the prediction reference image by processing similar to that of the second FP production unit 240 of the fourth embodiment. The prediction reference image provided by the adaptive FP production unit 372 are stored in the prediction reference region storage unit 374.

The predicted image production unit 376 generates a motion vector from the MVD of the processing target block, which is decoded by the decoding unit 352. The predicted image production unit 376 takes an image of a region specified by the motion vector of the processing target block, among the prediction reference image produced by the adaptive FP production unit 372, as a predicted image. The predicted images are determined for all of the blocks of the decoding target frame, and are output to the addition unit 362.

Figure 27:
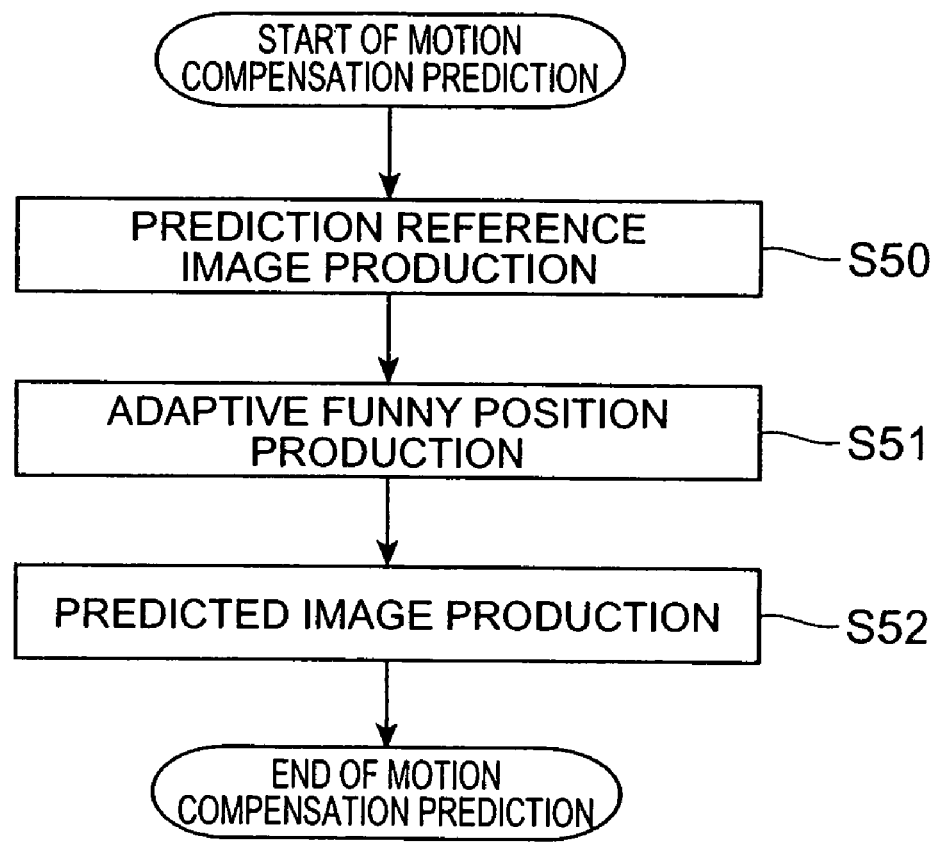
FIG. 27 is a flow chart which shows the processing of motion compensation prediction in a video decoding method relating to a sixth embodiment.

The video decoding method of the sixth embodiment will be described below. In regard to this video decoding method, the motion compensation prediction processing that differs from that of the video decoding method of the fourth embodiment will be described. FIG. 27 is a flow chart which shows the processing of motion compensation prediction in a video decoding method relating to a sixth embodiment. In this motion compensation prediction processing, as is shown in FIG. 27, the prediction reference image is first produced by the prediction reference region production unit 370 (step S50). The prediction reference image is produced on the basis of a predetermined region in the reference frame that is required for producing the predicted image. Next, the absolute value of the MVD of the processing target block is compared with a predetermined value, and the prediction reference image provided with the number of FPs corresponding to the results of this comparison are produced (step S51). Next, a motion vector is produced by the predicted image production unit 376 from the MVD of the processing target block. Then, an image of a region specified by the motion vector of the processing target block is extracted by the predicted image production unit 376, and the image is output as a predicted image (step S52). The processing of steps S50 through S52 is performed for all of the blocks of the decoding target frame, so that the decoding target frames is restored.

Figure 28:
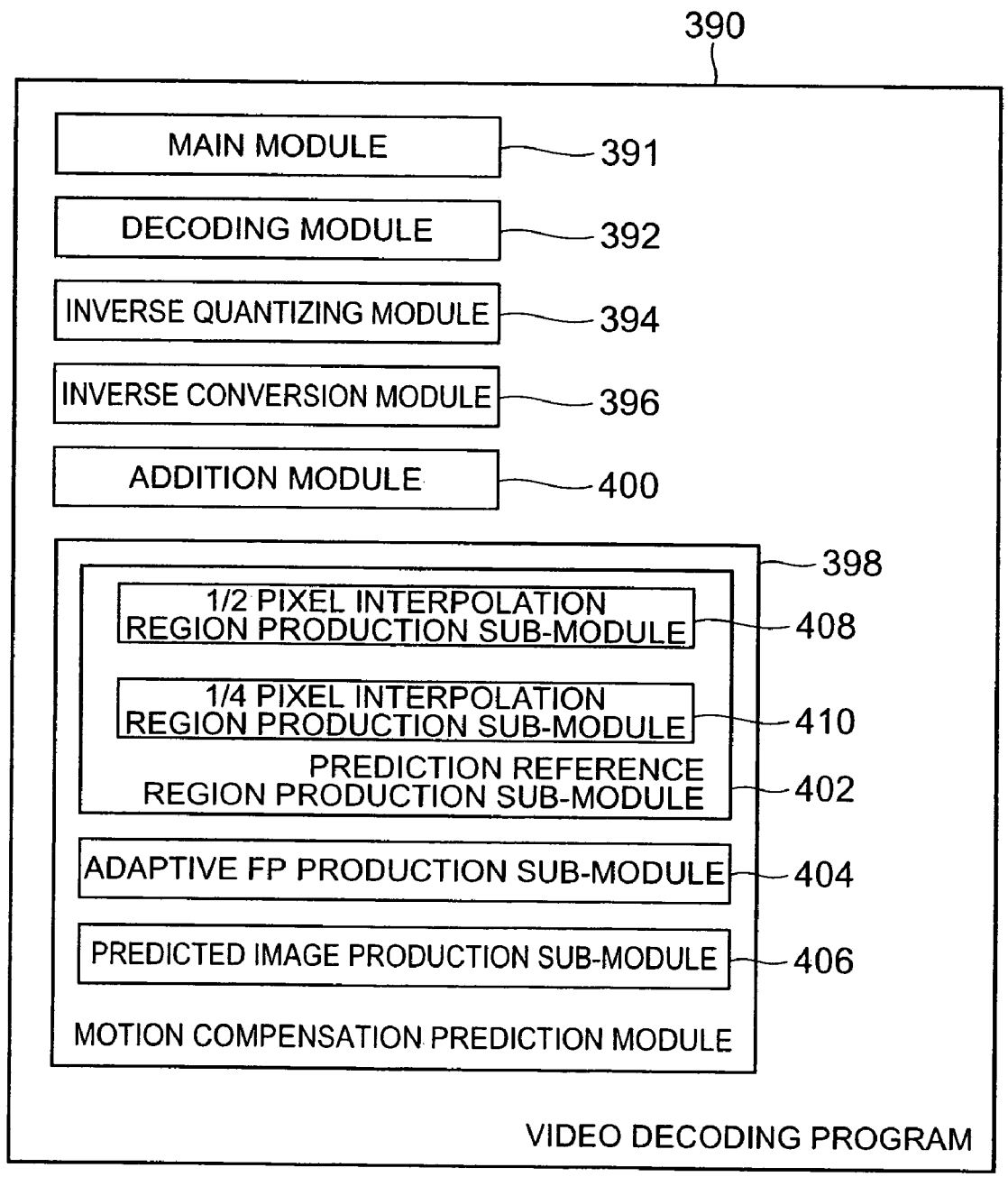
FIG. 28 is a diagram which shows the configuration of a video decoding program relating to a sixth embodiment.

The video decoding program 390 that is used to cause a computer to operate as the video decoding apparatus 350 will be described below. FIG. 28 is a diagram which shows the configuration of a video decoding program relating to a sixth embodiment. The video decoding program 390 comprises a main module 391 that generalizes the processing, a decoding module 392, an inverse quantizing module 394, an inverse conversion module 396, a motion compensation prediction module 398, and an addition module 400. The motion compensation prediction module 398 comprises a prediction reference region production sub-module 402, an adaptive production sub-module 404, and a predicted image production sub-module 406. The prediction reference region production sub-module 402 comprises a 1/2 pixel interpolation region production sub-module 408 and a 1/4 pixel interpolation region production sub-module 410.

The functions that are realized in a computer by the decoding module 392, inverse quantizing module 394, inverse conversion module 396, motion compensation prediction module 398, addition module 400, prediction reference region production sub-module 402, adaptive production sub-module 404, predicted image production sub-module 406, 1/2 pixel interpolation region production sub-module 408 and 1/4 pixel interpolation region production sub-module 410 are respectively the same as the decoding unit 352, inverse quantizing unit 354, inverse conversion unit 356, motion compensation prediction unit 358, addition unit 362, prediction reference region production unit 370, adaptive FP production unit 372, predicted image production unit 376, 1/2 pixel interpolation region production unit 380 and 1/4 pixel interpolation region production unit 382. The video decoding program 390 is provided, for example, by recording media such as CD-ROM, DVD, ROM, or by semiconductor memories. The video decoding program 390 may be a program provided as computer data signals over a carrier wave through a network.

Thus, the video decoding apparatus 350 of the sixth embodiment can restore the video by faithfully performing the processing that is the inverse processing with respect to the processing of the video encoding apparatus 160.

The principles of the present invention have been illustrated and described in the preferred embodiments, but it is apparent to a person skilled in the art that the present invention can be modified in arrangement and detail without departing from such principles. We, therefore, claim rights to all variations and modifications coming with the spirit and the scope of claims.

What is claimed is:

1. A video encoding method comprising: dividing a coding target frame into a plurality of blocks, wherein each of the blocks corresponds to a predicted reference image to be generated; determining a motion vector for each of the blocks; extracting, for an operable block within the blocks, motion complexity information of the operable block, wherein the motion complexity information of the operable block indicates a degree of complexity of movement between the operable block of the coding target frame and a corresponding block in a reference frame; determining, for the operable block, a number of funny position pixels to include in the predicted reference image to be generated for the operable block based upon the motion complexity information of the operable block, wherein the determined number of funny position pixels included in the predicted reference image increases as the degree of complexity of movement of the operable block increases; generating the predicted reference image for the operable block, wherein the predicted reference image for the operable block includes integer pixels located at integer pixel positions within the predicted reference image, interpolated pixels located at interpolated pixel positions within the predicted reference image, and the determined number of funny position pixels; generating the predicted reference image corresponding to the coding target frame as a function of the motion vector determined for each of the blocks of the coding target frame; calculating a difference between the coding target frame and the predicted reference image for each of said blocks; converting the difference between the coding target frame and the predicted reference image for each of said blocks into a set of coefficients based upon a predetermined conversion rule; determining a number of non-zero coefficients in each set of coefficients for each of said blocks; and wherein extracting motion complexity information of the operable block comprises: determining a number of non-zero coefficients in the blocks that neighbor the operable block, wherein the motion complexity information of the operable block is based upon the number of non-zero coefficients in the blocks that neighbor the operable block.

2. The video encoding method of claim 1, wherein the corresponding block in the reference frame includes a reference image, and wherein the reference image includes reference pixels located at integer pixel positions within the reference image, and wherein generating said predicted reference image for the operable block comprises: selecting pixel values of the reference pixels included in the reference image of the corresponding block as the pixel values of the integer pixels to include in the predicted reference image.

3. The video encoding method of claim 2, wherein generating the predicted reference image for the operable block further comprises: generating the interpolated pixels to include in the predicted reference image for the operable block, wherein the interpolated pixels are based upon the reference pixels included in the reference image of the corresponding block and reference pixels in reference images of blocks in the reference frame that neighbor the corresponding block in the reference frame.

4. The video encoder method of claim 3, wherein the interpolated pixels are generated with an interpolation algorithm, and for each of the interpolated pixels, the interpolator algorithm including a high-frequency cutoff characteristic; wherein the funny position pixels are generated with a low-pass filter, wherein the low-pass filter includes a high-frequency cutoff characteristic; and wherein for a respective funny position pixel of the funny position pixels, the high-frequency cutoff characteristic of the low-pass filter used to generate the respective funny position pixel is less than the high-frequency cutoff characteristic of the interpolator algorithm used to generate the interpolated pixels that neighbor the respective funny position pixel.

5. The video encoding method of claim 1, wherein determining, for the operable block, the determined number of funny position pixels to include in the predicted reference image, further comprises: determining whether the degree of complexity of movement of the operable block exceeds a threshold; and in response to determination that the degree of complexity of movement of the operable block exceeds the threshold, selecting the determined number of funny position pixels to be greater than one.

6. The video encoding method of claim 1, wherein generating the predicted reference image for the operable block comprises: selecting pixel values of original pixels within the corresponding block in the reference frame as the pixel values of the integer pixels to include in the predicted reference image for the operable block, wherein the pixel values of the original pixels selected as the pixel values of the integer pixels are unfiltered.

7. The video encoding method of claim 1, wherein generating the predicted reference image for the operable block further comprises: generating the determined number of funny position pixels, wherein each of the funny position pixels corresponds to one of a plurality of funny position locations within the predicted reference image, wherein each of the funny position locations corresponds to a set of low-pass filter coefficients, and wherein a pixel value for each of funny position pixels is generated based upon the set of low-pass filter coefficients corresponding to said one of the plurality of funny position locations.

8. The video encoding method of claim 7, wherein the determined number of funny pixels includes a funny position pixel located at a funny position location, and wherein generating the determined number of funny position pixels further comprises: calculating the pixel value for the funny position pixel based upon the integer pixels located in a horizontal line of pixels of the coding target frame that are spatially closest to the funny position location of the funny position pixel.

9. A computer readable memory media comprising: the computer readable memory media including computer program code stored thereon, wherein the computer program code is executable on a processor, the computer program code including instructions to: divide a coding target frame into a plurality of blocks, wherein each of the blocks corresponds to a predicted reference image to be generated; determine a motion vector for each of the blocks; extract, for an operable block within the blocks, motion complexity information of the operable block, wherein the motion complexity information of the operable block indicates a degree of complexity of movement between the operable block of the coding target frame and a corresponding block in a reference frame; determine, for the operable block, a number of funny position pixels to include in the predicted reference image to be generated for the operable block based upon the motion complexity information of the operable block, wherein the determined number of funny position pixels included in the predicted reference image increases as the degree of complexity of movement of the operable block increases; and generate the predicted reference image for the operable block, wherein the predicted reference image for the operable block includes integer pixels located at integer pixel positions within the predicted reference image, interpolated pixels located at interpolated pixel positions within the predicted reference image, and the determined number of funny position pixels; generate the predicted reference image corresponding to the coding target frame as a function of the motion vector determined for each of the blocks of the coding target frame; calculate a difference between the coding target frame and the predicted reference image for each of said blocks; convert the difference between the coding target frame and the predicted reference image for each of said blocks into a set of coefficients based upon a predetermined conversion rule; and wherein the instructions to extract the motion complexity information of the operable block comprises instructions to determine a number of non-zero coefficients in said blocks that neighbor the operable block, wherein the motion complexity information of the operable block is based upon the number of non-zero coefficients in said blocks that neighbor the operable block.

10. The computer readable memory media of claim 9, wherein instructions to generate said predicted reference image for the operable block comprises instructions to select pixel values of original pixels of the corresponding block in the reference frame as the pixel values of the integer pixels to include in the predicted reference image.

11. The computer readable memory media claim 9, further comprising instructions to: generate a predicted reference image corresponding to the coding target frame as a function of the motion vector determined for each of the blocks of the coding target frame; calculate a difference between the coding target frame and the predicted reference image for each of said blocks; convert the difference between the coding target frame and the predicted reference image for each of said blocks into a set of coefficients based upon a predetermined conversion rule; determine the number of non-zero coefficients in each set of coefficients for each of said blocks; and determine a number of non-zero coefficients in said blocks that neighbor the operable block, wherein the complexity information of the operable block is based upon the number of non-zero coefficients.

12. The computer readable memory media of claim 9, wherein instructions to determine, for the operable block, the number of funny position pixels to include in the predicted reference image comprise instructions to: determine whether the degree of complexity of movement of the operable block exceeds a threshold; and in response to determination that the degree of complexity of movement of the operable block exceeds the threshold, select the determined number of funny position pixels to be greater than one.

13. The computer readable memory media of claim 9, wherein instructions to extract, for the operable block, the motion complexity information of the operable block comprise instructions to: calculate a differential motion vector for at least some of the blocks in the coding target frame that neighbor the operable block as a function of the motion vector of the operable block and the motion vector of each of the blocks in the coding target frame that neighbor the operable block; and wherein the degree of complexity of movement is based upon at least some of the calculated differential motion vector for each of the blocks in the coding target frame that neighbor the operable block.

14. The computer readable memory media of claim 9, wherein instructions to generate the predicted reference image for the operable block comprise instructions to generate the determined number of funny position pixels, wherein each of the funny position pixels corresponds to one of a plurality of funny position locations within the predicted reference image, wherein each of the funny position locations corresponds to a set of low-pass filter coefficients, and wherein a pixel value for each of funny position pixels is generated based upon the set of low-pass filter coefficients corresponding to said one of the plurality of funny position locations.

15. A video decoding method comprising: dividing a decoding target frame into a plurality of blocks, wherein each of the blocks corresponds to a predicted reference image to be generated; decoding a compressed data stream to generate a motion vector for an operable block and a motion vector for each of the blocks in the decoding target frame that surround the operable block in the decoding target frame; extracting, for an operable block within the blocks, motion complexity information of the operable block, wherein the complexity information of the operable block indicates a degree of complexity of movement between the operable block of the decoding target frame and a corresponding block in a reference frame; determining, for the operable block, a number of funny position pixels to include in the predicted reference image to be generated for the operable block based upon the motion complexity information of the operable block, wherein the number of funny position pixels included in the predicted reference image increases as the degree of complexity of movement of the operable block increases; generating the predicted reference image for the operable block based upon integer pixels of the corresponding block in the reference frame, integer pixels of blocks in the reference frame that surround the corresponding block, the motion vector of the operable block, and the motion vector of each of the blocks that surround the operable block in the decoding target frame, wherein the predicted reference image for the operable block includes integer pixels located at integer pixel positions within the predicted reference image, interpolated pixels located at interpolated pixel positions within the predicted reference image, and the determined number of funny position pixels; generating the predicted reference image corresponding to the decoding target frame as a function of the motion vector determined for each of the blocks of the decoding target frame; calculating a difference between the decoding target frame and the predicted reference image for each of said blocks; converting the difference between the decoding target frame and the predicted reference image for each of said blocks into a set of coefficients based upon a predetermined conversion rule; and wherein extracting motion complexity information of the operable block comprises: determining a number of non-zero coefficients in said blocks that neighbor the operable block, wherein the complexity information of the operable block is based upon the number of non-zero coefficients in said blocks that neighbor the operable block.

16. The video decoding method of claim 15, wherein generating the predicted reference image for the operable block further comprises: generating the interpolated pixels to include in the predicted reference image for the operable block, wherein the interpolated pixels are based upon the reference pixels of the corresponding block in the reference frame and reference pixels of blocks in the reference frame that surround the corresponding block.

17. The video decoder method of claim 15, wherein the interpolated pixels are generated with an interpolation algorithm, and for each of the interpolator pixels, the interpolator algorithm including a high-frequency cutoff characteristic; wherein the funny position pixels are generated with a low-pass filter, wherein the low-pass filter includes a high-frequency cutoff characteristic; and wherein for a respective funny position pixel of the funny position pixels, the high-frequency cutoff characteristic of the low-pass filter used to generate the respective funny position pixel is less than the high-frequency cutoff characteristic of the interpolator algorithm used to generate the interpolated pixels that neighbor the respective funny position pixel.

18. The video decoding method of claim 15, wherein determining, for the operable block, the number of funny position pixels to include in the predicted reference image, further comprises: determining whether the degree of complexity of movement of the operable block exceeds a threshold; and in response to determination that the degree of complexity of movement of the operable block exceeds the threshold, selecting the determined number of funny position pixels to be greater than one.

19. The video decoding method of claim 15, wherein generating the predicted reference image for the operable block further comprises: generating the determined number of funny position pixels, wherein each of the funny position pixels corresponds to one of a plurality of funny position locations within the predicted image, wherein each of the funny position locations corresponds to a set of low-pass filter coefficients, and wherein a pixel value for each of funny position pixels is generated based upon the set of low-pass filter coefficients corresponding to said one of the plurality of funny position locations.

20. The video decoding method of claim 19, wherein the determined number of funny pixels includes a funny pixel located at a funny position location, and wherein generating the determined number of funny position pixels further comprises: calculating the pixel value for the funny position pixel based upon the integer pixels located in a horizontal line of pixels of the decoding target frame that are spatially closest to the funny position locations of the funny position pixel.

21. A computer readable memory media comprising: the computer readable memory media including computer program code stored thereon, wherein the computer program code is executable on a processor, the computer program code including instructions to implement the method according to claim 15.

22. A computing system comprising: a computer readable memory media including stored therein a plurality of executable instructions; and a processor coupled to the computer readable memory media, the processor configured to execute at least a subset of the plurality of executable instructions to implement a method according to claim 15.

* * * * *